United States Patent [19]

Hosaka et al.

[11] Patent Number: 5,001,409
[45] Date of Patent: Mar. 19, 1991

[54] SURFACE METROLOGICAL APPARATUS

[75] Inventors: Sumio Hosaka, Nishitama; Shigeyuki Hosoki, Hachioji; Keiji Takata, Tokorozawa; Masatoshi Ohtake, Ome; Hiroshi Tooyama, Hachioji; Hitoshi Kondou, Hachioji, all of Japan

[73] Assignee: Hitachi, Ltd., Tokyo, Japan

[21] Appl. No.: 368,304

[22] PCT Filed: Sep. 22, 1988

[86] PCT No.: PCT/JP88/00967
§ 371 Date: Jun. 7, 1989
§ 102(e) Date: Jun. 7, 1989

[87] PCT Pub. No.: WO89/03510
PCT Pub. Date: Apr. 20, 1989

[30] Foreign Application Priority Data

Oct. 9, 1987 [JP] Japan .................................. 62-253638
Feb. 15, 1988 [JP] Japan .................................. 63-30740
Jun. 24, 1988 [JP] Japan .................................. 63-154695

[51] Int. Cl.$^5$ ............................................. G05B 11/18
[52] U.S. Cl. .................................... 318/592; 318/593; 318/594; 250/306
[58] Field of Search ...................... 318/592, 593, 594; 250/306

[56] References Cited

U.S. PATENT DOCUMENTS 4,772,817  9/1988  Aida et al. ........................... 310/328
4,870,352  9/1989  Koechner ....................... 324/158 D Primary Examiner—William M. Shoop, Jr.
Assistant Examiner—Saul M. Bergmann
Attorney, Agent, or Firm—Antonelli, Terry Stout & Kraus

[57] ABSTRACT

In an apparatus for measuring texture and characterization of the surface of a sample on the basis of the drive signal of a servo control circuit by allowing a probe-tip (1) to approach the sample (2) and subjecting the probe-tip (1) to servo control so that a current, which is generated by moving the probe-tip (1) on the sample surface and which flows between the probe-tip (1) and the sample (2), becomes constant, the present invention discloses a surface metrological apparatus comprising a circuit (11, 12) for correcting the texture and characterization of the sample by use of a current error of the measured value of the current described above from the set current value.

19 Claims, 14 Drawing Sheets

INCH WORM SYSTEM
FOR COARSE MOVEMENT

TRIPOD TYPE SCANNER
FOR 3 DIMENSIONAL
FINE MOVEMENT

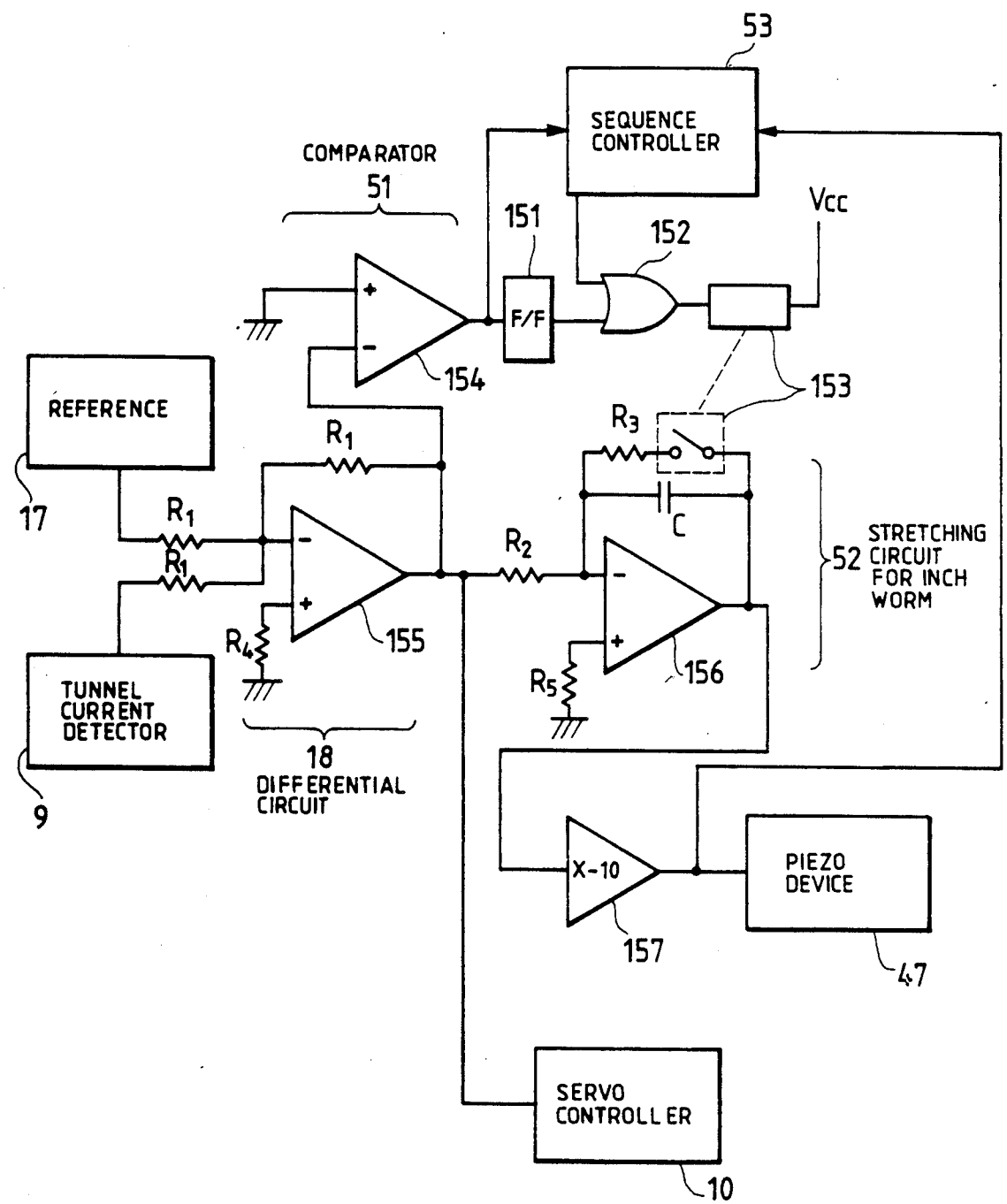

SURFACE METROLOGICAL APPARATUS

TECHNICAL FIELD

This invention relates to an apparatus for obtaining surface information of a sample by bringing a probe-tip close to the sample and obtaining the surface information on the basis of physical parameters such as a current that occur between the probe-tip and the sample. More particularly, the present invention relates to a surface metrological apparatus which can provide topography by scanning a probe-tip at a high speed, can observe a large area and can provide fine characterization.

BACKGROUND ART

A scanning tunneling microscope (STM) is known in the past as a system effective for observing a crystal structure of a solid surface with a sub-angstrom resolution ($Å = 10^{-10}$m).

The conventional STM apparatus employs the system wherein a probe-tip is fixed to the tip of a 3-dimensional fine actuator, and after the distance between the sample and the probe-tip is reduced to some dozens of angstroms to, a few angstroms by use of a coarse actuator (inchworm system) in a Z direction, the position of the probe-tip is subjected to servo control in such a manner as to keep a tunnel current flowing through the probe-tip constant while the inchworm system is fixed and the probe-tip is being scanned in the X and Y directions, in order to display the displacement of the probe-tip at that time. Such a system is disclosed, for example, in U.S. Pat. Specification No. 4,343,993.

On the other hand, a method of obtaining topography during high speed scanning by STM is discussed in Appl. Phys. Lett. 48 (1986), pp. 832–834.

The approaching method of the probe-tip and the sample and the observation area selecting method in accordance with the prior art are described in Appl. Phys Lett. 40 (1982), pp. 178–180.

Incidentally, the principle of STM is described in Scientific American (Japanese version), Oct. 1, 1985, pp. 10–17, and the like.

When high speed scanning is made in accordance with the prior art technique described above, the gap between the probe-tip and the sample is held at an arbitrary distance and after gap control is suspended, the probe-tip is moved on the sample surface and the tunnel current or field emission obtained from the change of the gap is used as the surface information. For this reason, the prior art technique involves the problems in that the structural information of topology cannot be obtained correctly and in that the probe-tip impinges against the sample when any corrugations exist inside the scanning area or the inclination between the scan surface and the sample surface is at least 10 Å or the sample surface grows such as crystal growth especially in the case of large scanning area.

Furthermore, the conventional STM is not free from the problem in that when high speed scanning is made, a fine structure cannot at all be measured because a servo system or a piezo device cannot respond to a high frequency range.

Still another problem of the prior art technique lies in that it does not consider any counter-measure when the change of relative positions between the probe-tip and the sample resulting from the inclination of the sample and its warp exceeds the movable range of the Z-direction fine actuator of the probe-tip or the digitizing error of data. This results in the problems such as the impingement of the sample and the probe-tip and suspension and nullification of measurement.

The prior art technique does not either consider the approach of the probe-tip having a sharp tip to the sample or instability of the tunnel current, and the approach of the probe-tip to the sample while its tip is kept sharp and selection of the observation area have left problems yet to be solved. Disclosure of Invention It is an object of the present invention to provide a surface metrological apparatus capable of high speed fine characterization even for a sample having a large area.

Unlike the prior art technique which does not subject the probe-tip to servo control in fast scanning but moves it on a predetermined plane to represent a current image, the first action of the present invention subjects the gap between the probe-tip and the sample to servo control even in the case of fast scanning in order to prevent at least the impingement of the probe-tip against the sample. When fast scanning is made, a detection current has an error against a set current value because the frequency response of the control system is not sufficiently high. The present invention makes conversion of current fluctuation to height error for this current and obtains accurate surface information by correcting the structural information or characterization by use of this height error.

The second action of the present invention employs a double servo loop structure consisting of a servo loop which keeps constant the tunnel current by moving a Z-axis fine actuator and a servo loop which controls a Z-axis coarse actuator so as to suppress the low frequency component of the application voltage to the fine actuator. In other words, the invention controls the coarse actuator in such a manner that the Z-axis fine actuator exists always in the movable range during data collection, and thus makes it possible to conduct large area observation.

The third action of the present invention is to make it possible to conduct observation over a wide range without interruption and nullification of data collection by applying, as an offset voltage of a data digitization circuit, the low frequency component of the application voltage to the fine actuator for keeping constant the gap between the probe-tip and the sample and thus shifting the digitization range.

The fourth action of the present invention is directed to having the probe-tip approach the sample without impingement between them and to selecting the observation area by disposing moving means for having the probe-tip closely approach the sample from a further distance or for selecting the observation area together with the fine actuator for keeping constant the gap between the probe-tip and the sample, and by stopping the operation of the moving means immediately after detection of tunnel current more than the set current value and moving it back further an arbitrary distance.

BRIEF DESCRIPTION OF THE DRAWINGS

FIG. 15 is a block diagram showing an example for driving a contraction piezo device of an inchworm system a constant speed;

FIG. 17 is a block diagram showing one example of a movement control circuit which drives a plurality of inchworm systems and has switching modes such as automatic approach, automatic movement, manual movement, and the like.

BEST MODE FOR CARRYING OUT THE INVENTION

Embodiment 1

Hereinafter, an embodiment which does not cause impingement between the probe-tip and the sample even in fast scanning and which can observe highly accurately the topography of the sample will be explained.

Figure 3:
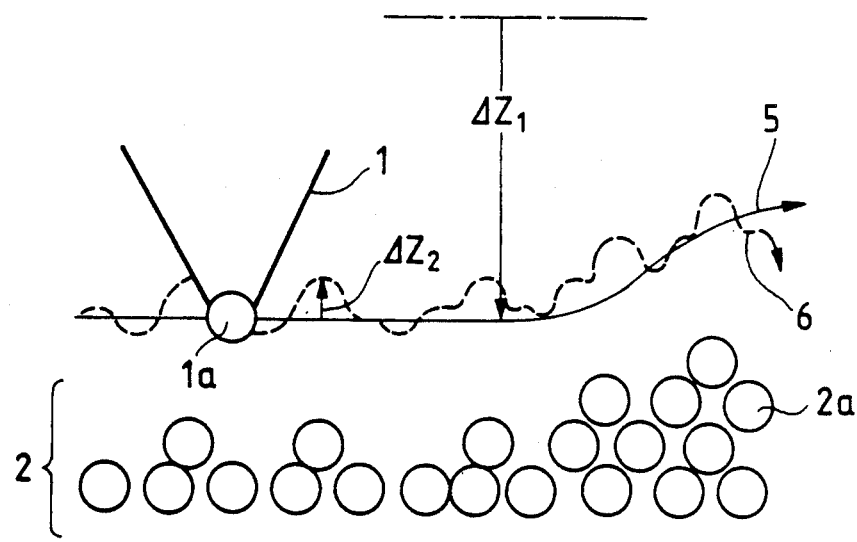
FIG. 3 is a schematic view showing the principle of one action of the present invention.

The principle of this embodiment will be first explained with reference to a schematic view of FIG. 3. When a potential difference (not shown) is generated between the probe-tip 1 and the sample 2, a current flows between the probe-tip atom 1a and the sample atoms 2a due to the tunnel phenomenon, and servo control is made by moving means (not shown) supporting the probe-tip 1 in such a manner that the tunnel current becomes constant. If the probe-tip 1 is moved at a high speed along the sample surface under this state, the trajectory 5 of the probe-tip is servo-controlled as represented by the solid line because the servo system cannot follow high frequency component. An ideal trajectory 6 is the one that is represented by the dotted line, and a height error $\Delta Z_2$ between both trajectories 6 and 5 is detected as the current fluctuation (current error component). Therefore, the correct topography can be obtained by correcting the change $\Delta Z_1$ of the trajectory 5 of the probe-tip by the height error $\Delta Z_2$ converted from the current error component.

Incidentally, the height error $\Delta Z_2$ can be obtained from the current error component in accordance with the following equation. For example, the tunnel current $I_t$ and the gap S have theoretically the following relation:

$$I_t = K_1 \frac{1}{S} \exp(-K_2 S) \tag{1}$$

where $K_1$ and $K_2$ are constants.

Accordingly, the current fluctuation $\Delta I_t$ can be expressed as follows by use of the gap change $\Delta S$:

$$\Delta I_t = -\left(\frac{1}{S} + K_2\right) I_t \Delta S \tag{2}$$

Equation (2) is $$\left(\frac{1}{S} << K_2\right)$$

in the range of $S \geq 5$ Å and is expressed by equation (3) below:

$$\Delta I_t = = K_2 I_t \Delta S \tag{3}$$

Therefore, the height error $\Delta Z_2$ is calculated from the error current $\Delta I_t$ in the following way:

$$\Delta Z_2 = -\frac{1}{K_2} \frac{\Delta I_t}{I_t} \tag{4}$$

Figure 1:
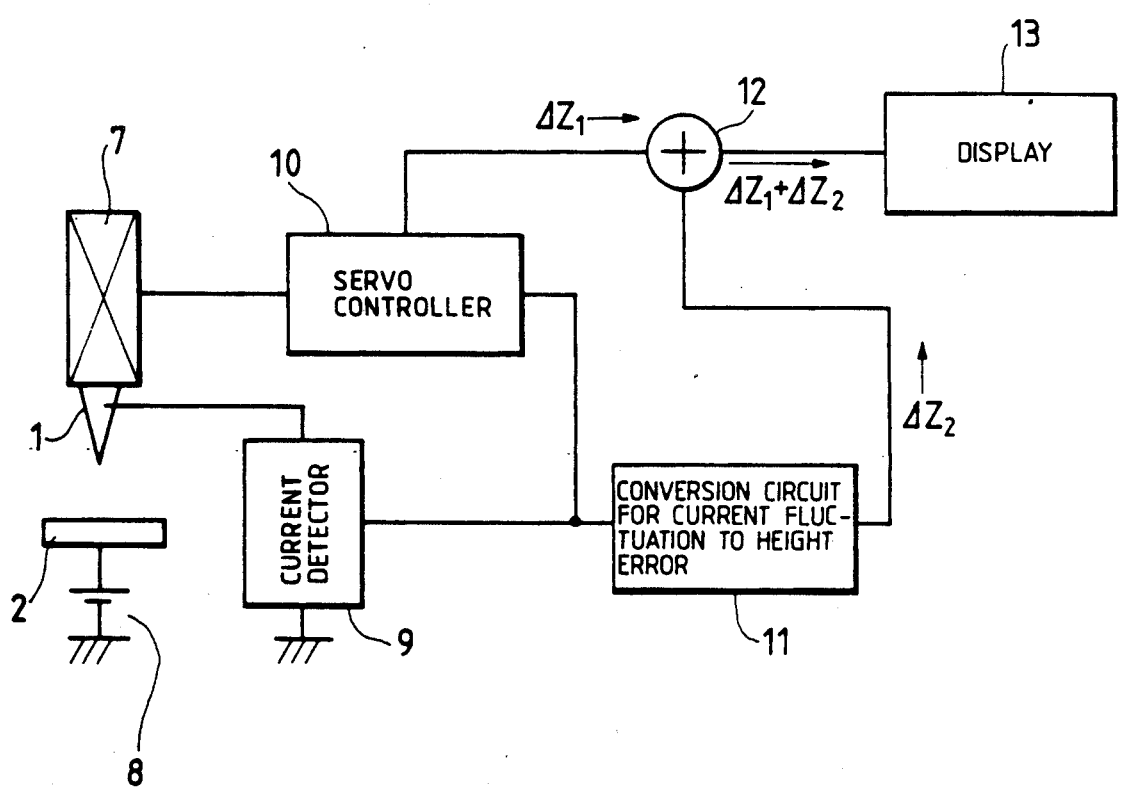
FIG. 1 a configuration of one embodiment of the present invention.

FIG. 1 shows the fundamental configuration of this embodiment. This embodiment consists of a piezo device 7 as moving means which supports a probe-tip 1, a servo circuit 10 as servo means, a power source as voltage application means, a current detector 9, a conversion circuit 11 (current fluctuation to a height error) and a correction circuit 12. When the probe-tip 1 is allowed to approach a sample 2 under such a state, a tunnel current or field emission current flows and is detected by the current detector 9. When this signal is applied to the servo circuit 10, the servo circuit 10 drives the piezo device 7 so that this current attains a predetermined reference value. As a result, the probe-tip 1 is subjected to servo-control so that its gap with the sample 2 is kept constant. However, if this gap changes rapidly at the time of scanning of the probe-tip 1 or the sample 2 in this instance, the servo system cannot follow the change and the gap changes between the probe-tip 1 and the sample 2. In consequence, a current is not kept constant and the output signal of the current detector 9 changes. This change is inputted to the servo circuit 10 as described above, and also inputted to the conversion circuit 11 (current fluctuation to height error). This conversion circuit 11 detects the error current from the reference value and detects the gap error value in accordance with equation (4). The correction circuit 12 consisting of an addition circuit corrects this detection signal $\Delta Z_2$ and the height information $\Delta Z_1$ outputted from the servo circuit 10, and the accurate topographical information ($\Delta Z_1 + \Delta Z_2$) can be obtained and monitored on a display 13. Incidentally, since the height information $\Delta Z_1$ outputted from the servo circuit 10 is outputted earlier than $\Delta Z_2$, time coincidence is preferably to be established between $\Delta Z_1$ and $\Delta Z_2$ by passing $\Delta Z_1$ through a delay circuit before it is inputted to the correction circuit 12. Furthermore, $\Delta Z_2$ must be corrected because it changes with material values on the surface of the sample. This correction may be made by determining a proportional constant from vibration means in the Z direction and the current fluctuation. Preferably the correction is made during, or, immediately before, the observation.

Embodiment 2

Figure 2:
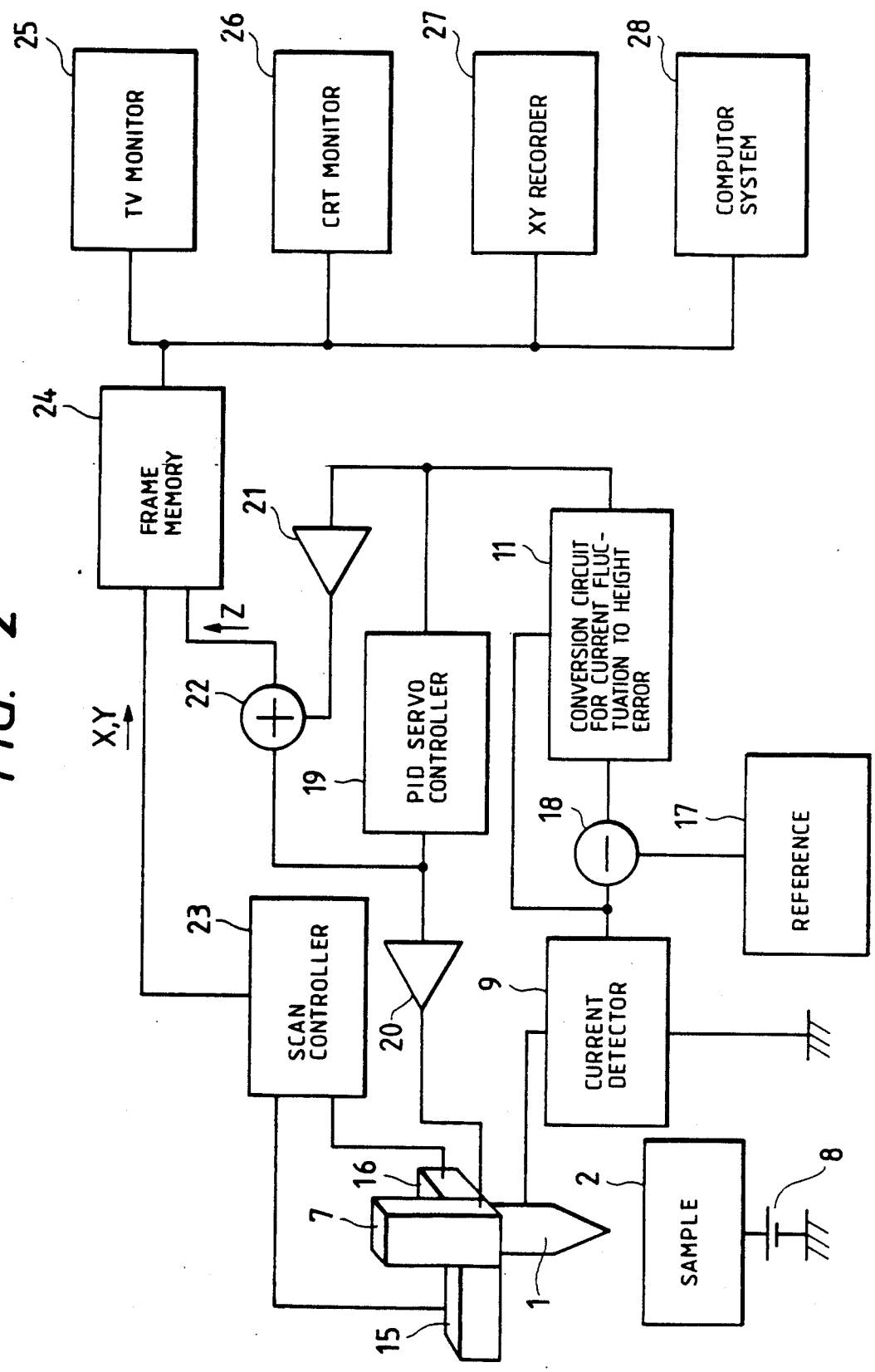
FIG. 2 is a configuration of one embodiment of the present invention.

FIG. 2 shows another embodiment of the invention when the first embodiment is applied to a scanning tunneling microscope (STM). Though this embodiment has the same structure as the one that is shown in FIG. 1, the difference lies in that the conversion circuit 11 (current fluctuation to height error) is incorporated in the servo system. This makes the servo system extremely stable. The power source applies the voltage to the sample 2. A two-dimensional scan controller 23, an X-axis piezo device 15 and a Y-axis piezo device 16 are added to perform the function of raster scanning of the probe-tip 1 on the surface of the sample 2, and a frame memory 24, a TV monitor 25, a CRT monitor 26, an X-Y recorder 27 and a computer system 28 are added for the purpose of three-dimensional display. In the drawing, the power source 8 applies the voltage to the sample 2, the current is detected by tunnel current detector 9 the error current is detected from comparison of a reference value from a reference current setting circuit 17 with the current by a subtraction circuit 18, and the error current is converted to the height error signal by the current conversion circuit 11. Thereafter, a constant current control is carried out by a servo controller 19, a high voltage amplifier 20 and the Z-axis piezo device 7 so that the height error signal described above becomes zero (0). On the other hand, the topographical information is obtained by adding the output signal of the servo controller 19 to the height error obtained by passing the output signal from the conversion circuit 11 through an amplifier 21 with a the correction circuit 22. Incidentally, the correction circuit 22 makes subtraction depending on the polarity of the height error. Though the height information from the servo system is shown used as the output of the servo controller 19 in the drawing, it is preferred to damp and use the output of the high voltage amplifier 20 if the frequency property of the high voltage amplifier 20 is low.

The scanning tunneling microscope drives the servo system, raster-scans the probe-tip 1 on the sample surface while keeping the gap constant and stores the three-dimensional information X, Y, Z of the topography in the frame memory 24. Thereafter the output is transferred or displayed from the frame memory 24 to the TV monitor 25, the CRT monitor 26, the X-Y recorder 27 or the computer system 28 to display the three-dimensional image. Besides gray scale modulation and topographic display, the computer system can make contour processing, three-dimensional display from an arbitrary angle or stereographic processing and tilt correction. Furthermore, the frame memory 24 is sometimes incorporated in the computer system. Incidentally, the servo system circuit is shown in FIG. 2 on the assumption of an analog processing system, but a digital processing system or a system containing the former may be embraced in the scope of the present invention. Furthermore, the conversion circuit 11 (current fluctuation to height error) is based on equation (4) but this circuit may be based on experimental data or other relationships and a table reference method or the use of conversion circuits of other functions in addition to the divider is also embraced in the scope of the present invention.

As described above, the scanning tunneling microscope using the present invention for fast scanning can provide topography of the sample 2 or a surface atomic image without the impingement of the probe-tip 1 against the sample 2. In other words, the crystal growth process of the sample and the adsorption process can be observed at a video rate and on-the-spot observation of a video image can be made. Since the probe-tip 1 does not impinge against the sample 2 in the present invention, high speed read-out can be made when the invention is applied to read-out of a large capacity file memory.

In connection with the constituent elements of the servo system, the frequency response can be improved easily by improving merely the frequency characteristics of the current detector 9, subtraction circuit 18, conversion circuit 11 (current fluctuation to height error), amplifier 21 and correction circuit 22 even if the conventional constituent elements such as the servo controller 19 whose frequency characteristics are most difficult to improve, the high voltage amplifier 20 and the Z-axis piezo device 7 are used.

Though the foregoing embodiments illustrate the cases where the solid probe is used, the present invention can apply in exactly the same way to the use of a liquid metal or an electron or ion.

In accordance with this embodiment, the three-dimensional shape can be measured on the surface of the sample without the impingement of the probe-tip against the sample even when the probe-tip is moved fast on the sample surface, and in-situ observation of the crystal growth process or the like, that has not been possible conventionally, can now be made. The present invention can be accomplished by improving the operation speed of amplifiers of electrical circuits and provides a great economical effect such as the reduction of economical burden. In other words, the scanning speed can be increased at least 100 times by merely improving the constituent elements of the prior art technique.

Embodiment 3

Still another embodiment of the present invention which makes it possible to observe or inspect the sample over a wide range without causing the impingement between the probe-tip and the sample even when any inclination, warp, non-uniformity in thickness, etc. exist in the sample to be measured will be demonstrated.

This embodiment is characterized in that it employs a double loop structure consisting of a servo loop which keeps constant the tunnel current by operating a Z-direction fine actuator and a servo loop which controls a Z-axis coarse actuator in order to make constant the low frequency component of the application voltage to the fine actuator, and control is conducted so that the Z-direction fine actuator is always within the movable range during data collection.

Figure 4:
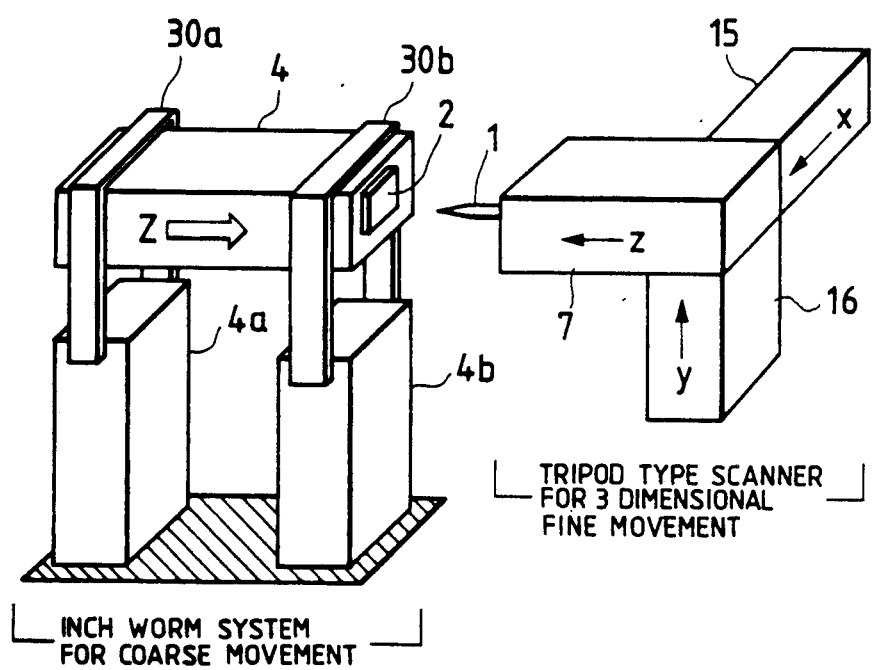
FIG. 4, is a conceptual view of an STM scanning system in one embodiment of the present invention.

FIG. 4 is a conceptual view of a scanning system of a scanning tunneling microscope (STM), which consists of a tripod type scanner for three-dimensional fine movement and an inchworm system for coarse movement. Their actuators each use a piezo device using a ceramic blank material. The three-dimensional scanning system consists of a Z-direction fine actuator 7 moving finely in such a manner as to keep constant the gap between the sample 2 and the probe-tip, an X-direction scanning actuator 15 and a Y-direction scanning actuator, 16, and the probe-tip 1 whose tip is worked sharp and which is fixed to the tip of this scanning system in the Z-direction. On the other hand, the sample 2 to be measured is fixed to the tip of the Z-direction coarse (forward) actuator 4 of the inch worm system for coarse movement. In the proximity of both ends of the actuator 4 are disposed for lock, which causes an inchworm movement, an A actuator 4a a lock metal 30a for holding one of the sides of the forward actuator 4, a B actuator 4b for holding the opposite side and a lock metal 30b. These members together constitute the Z-direction inch worm system for coarse movement. In the example shown in the drawing, the B actuator 4b is contracted, the metal 30b holds the sample fitting side of the forward actuator 4 to prevent its movement, the other A actuator 4a is stretched and its metal 30a is away from the forward actuator 4 or is under the state where the sample fitting surface of the actuator 4 and its opposite side are permitted to make free movement. Incidentally, the practical STM system includes the X- and Y-direction coarse movement systems and when they are combined with the Z-direction coarse movement system, the probe-tip 1 can be moved close to an arbitrary coordinate plane of the sample surface.

Figure 6:
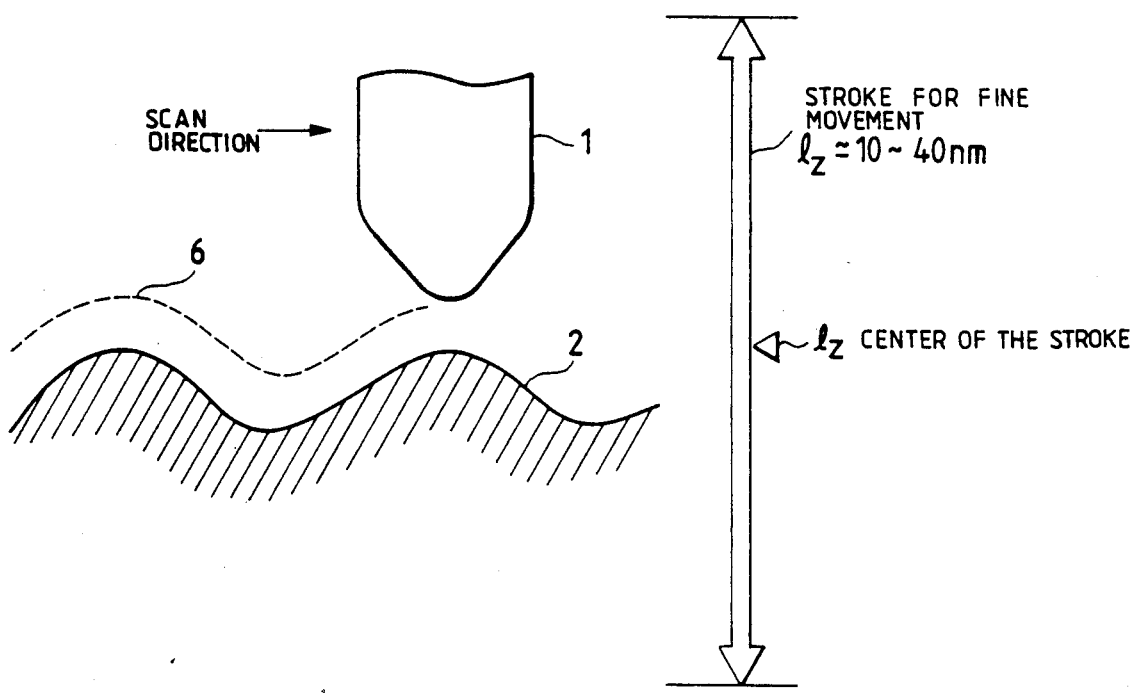
FIG. 6 is an explanatory view of the movable range of a fine actuator.

FIG. 6 is a view for explaining the motion of the Z-direction fine actuator. Generally, the maximum movable (fine movement) stroke 1Z of the fine actuator is set to a small value in order to obtain high resolution and this embodiment uses a piezo device of 100 Å to 400 Å (10 to 40 nanometers). The gap between the probe-tip 1 and the sample 2 is held at about 10 Å and when the probe-tip is moved under this state, it is moved while describing the trajectory 6 along the surface corrugations of the sample 2.

Figure 5:
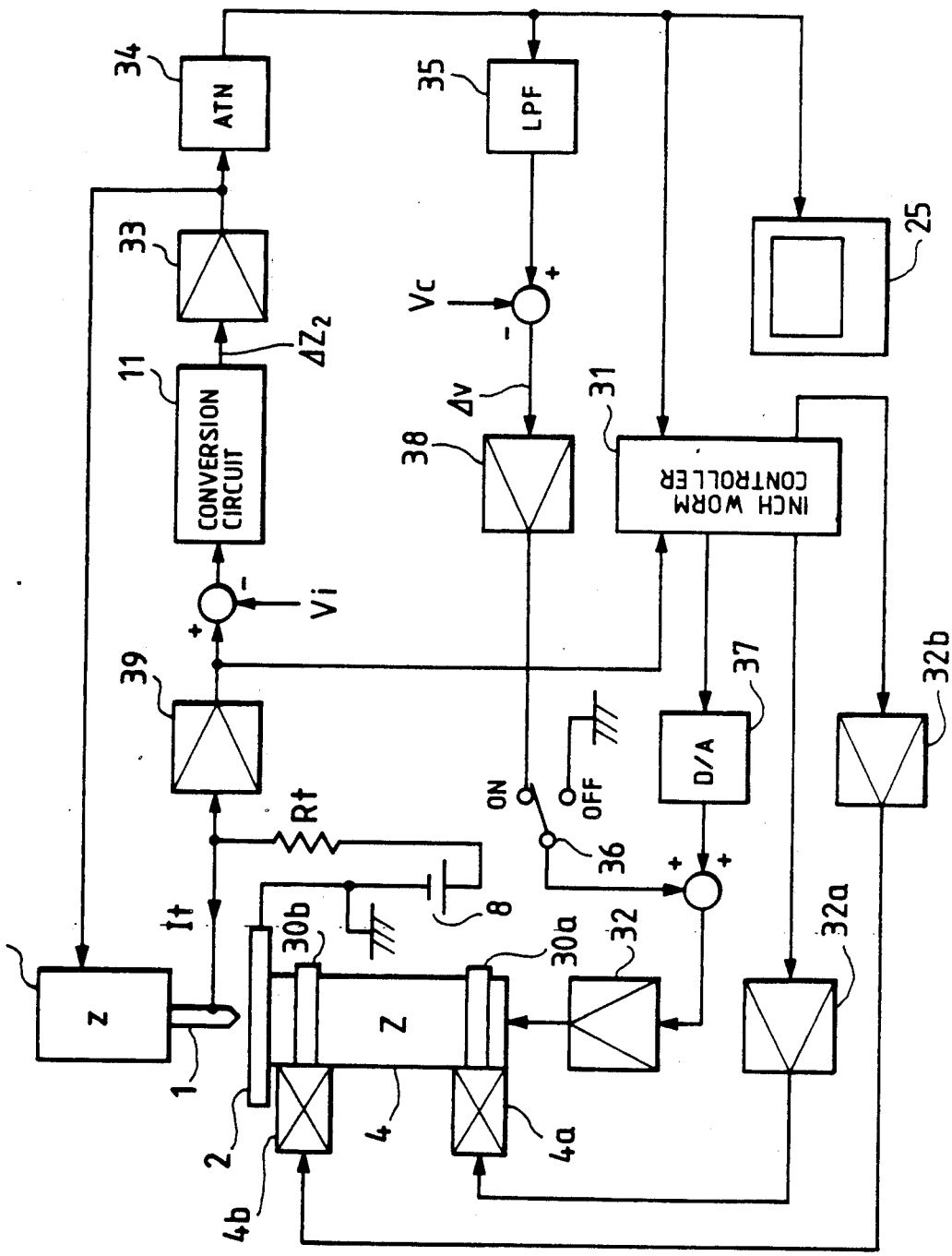
FIG. 5 is a block circuit diagram of one embodiment of the present invention.

FIG. 5 is a circuit block diagram. The sample 2 is held at ground voltage and the tunnel application voltage 8 is connected to the probe-tip 1 through a resistor $R_t$ for current detection. Under this state the probe-tip 1 and the sample 2 are allowed to approach each other while contracting and stretching the Z coarse (forward) actuator 4 and the holding actuators 4a, 4b by the piezo driver amplifiers 32, 32a, 32b in accordance with the sequence of the inchworm controller 31 (which will be described later with reference to FIG. 8) and when the gap between them approaches about 10 Å, the tunnel current $I_t$ flows between the probe-tip and the sample. This tunnel current $I_t$ is converted to a voltage by the resistor $R_t$ for current detection, amplified by a measuring amplifier 39, and subjected to subtraction of the reference tunnel current value $V_i$ and the result becomes the height error signal $\Delta Z_2$ between the probe-tip 1 and the sample 2 through the current conversion circuit 11. (As described in U.S. Pat. No. 4,343,993, since the relationship between the tunnel current and the gap is non-linear, the signal must be reconverted to the linear signal by use of the conversion circuit 11 described above). The signal is amplified by the piezo driver amplifier 33 for $\Delta Z_2$ so that this height error $\Delta Z_2$ becomes zero or in other words, the gap between the sample 2 and the probe-tip 1 becomes constant, and the Z-direction fine actuator 7 is driven. On the other hand, the output signal of the piezo driver amplifier 33, that is, the contraction information of the Z-direction fine actuator 7, is attenuated to a predetermined value by an attenuator 34 and displayed on the monitor TV 25 for gray scale display. The differential signal (the reference application voltage error component $\Delta v$ to the Z-direction fine actuator) between the means value of the application voltage to the Z-direction fine actuator 7 after elimination of the high frequency component (the fine corrugation information component on the sample surface) at the time of scanning by the low-pass filter 35 and the reference application voltage value (target contraction dimension) $V_c$ to said actuator 7 is passed through the amplifier 38 and a change-over switch 36, combined with the output signal of a D-A converter 37 for extending and contracting the Z-direction coarse actuator 4 on the basis of the instruction from the inchworm controller 31 and is inputted to the piezo driver amplifier 32 so as to drive the Z-direction coarse actuator 4. (At this time, the holding mechanism 30a must be kept under the lock state while 30b must be kept under the released state.) Thus the servo control is made in such a manner that the application voltage to the Z-direction fine actuator 7 suppresses the low frequency range.

Figure 7:
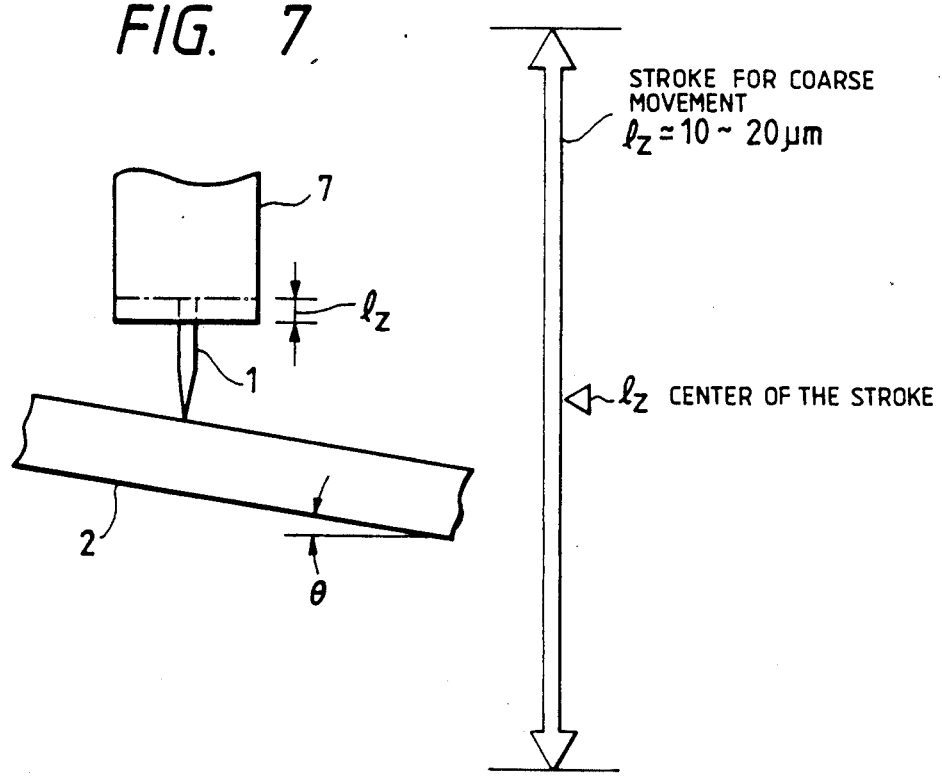
FIG. 7 is a relational diagram between the movable ranges of the fine and coarse actuators.

FIG. 7 shows the relationship between the movable range 1Z and the coarse actuator for explaining supplementary the double servo structure explained with reference to FIG. 5. As explained with reference to FIG. 6, the movable range 1Z of the fine actuator 7 is set to a small value (100 Å–400 Å) in order to improve detection resolution. On the other hand, the Z-direction coarse actuator (forward actuator of the inchworm system) has a large movable range ($1Z = 10\mu m - 20\mu m$ in this embodiment) in order to move rapidly the probe-tip toward the sample. It will be hereby assumed that the sample 2 is fixed to the holder at an angle $\theta$. When the probe-tip 1 is moved, the servo limit will be exceeded when the movable range 1Z of the Z-direction fine actuator 7 is used and measurement will become impossible or the sample 2 and the probe-tip 1 will impinge against each other. Therefore, it becomes necessary to use a servo loop which operates to cancel this $\theta$ component by use of the coarse actuator having a large movable range.

Figure 8:
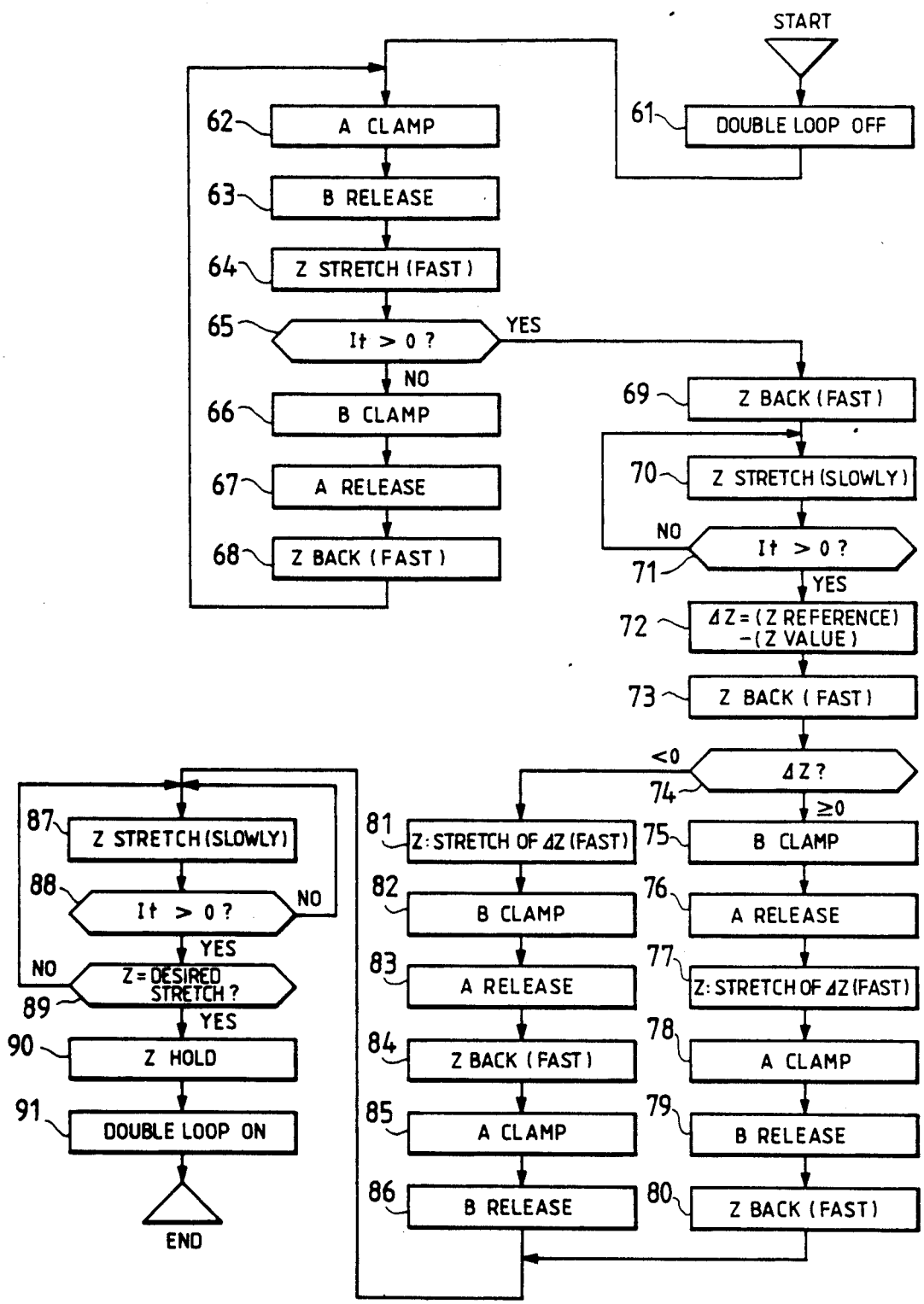
FIG. 8 is a flowchart for the automatic approach of a probe-tip to a sample.

FIG. 8 is a flowchart for automatically allowing the sample to approach the probe-tip in an optimal state by operating them by the double servo system. The description will be made by also referring to FIG. 5. First of all, the loop system added before the operation of the automatic approach sequence is opened (step 61; or the change-over switch 36 shown in FIG. 5 is set to OFF). The application voltage to the A-side holding system actuator 4a of the inchworm is made zero to bring the A-side lock metal 30a into the hold state (step 62) and a voltage ($=100$V) is applied to the B-side holding system actuator 4b to release the B-side lock metal 30b (step 63). The voltage ($=100$V) is applied step-wise to the Z-direction coarse (forward) actuator 4 so as to rapidly stretch this actuator (step 64) and to judge whether or not the tunnel current $I_t$ starts flowing (step 65). If it does not, the application voltage to the B-side holding system actuator 4b is made zero to keep the B side under the hold state (step 66) and a voltage ($=100$V) is applied to the A-side holding system actuator 4a so as to release the A side (step 67). The voltage applied to the Z coarse actuator 4 is made rapidly zero to contract rapidly this actuator (step 68) and thereafter the flow returns to the step where the A side is kept under the hold state (step 62), thereby completing the loop.

Whenever this looping from the steps 62 to 68 is once carried out, the Z-direction coarse actuator 4 advances towards the probe-tip 1 by the quantity extended by the application voltage (approx. 10 to 20$\mu$m in this embodiment) so that the sample 2 and the probe-tip 1 approach rapidly each other. When they approach the gap (=10 Å~20 Å) at which the tunnel current $I_t$ starts flowing, the flow escapes from the loop 62–68 at the step 65 of judgement and at the same time, the Z coarse actuator 4 is rapidly contracted (step 69). Thereafter a fine step-like voltage is applied to the Z coarse actuator 4 so as to start extending the actuator 4 by a fine change corresponding to one step (one step =approx. 1.5 Å in this embodiment; step 70), and the increase in the application voltage to the actuator 4 is continued until the tunnel current $I_t$ starts flowing (step 71). The increasing step of the application voltage to the actuator 4 is stopped at the point of time at which the tunnel current $I_t$ starts flowing and the difference $\Delta Z$ between the center value or reference value of the movable range of the Z coarse actuator 4 and the voltage value applied to this actuator 4 at the stopping point is calculated (step 2). Thereafter the Z coarse actuator 4 is contracted (step 73). Incidentally, the loop of steps 62 to 68 will be explained in detail in Embodiment 6. Whether the $\Delta Z$ value calculated previously is positive or negative is judged (step 74) and if it is positive, it means that the extension of the Z coarse actuator 4 is shorter than the center value (reference value) of the movable range of this actuator 4. Therefore, the automatic approach to the moving center of the coarse actuator 4 can be made by moving it back by this quantity ($\Delta Z$). The flow of this move-back operation by $\Delta Z$ is shown by the steps 75 to 80.

Namely, the B-side lock metal 30b clamps end of the actuator 4 (step 75) while the, A-side lock metal 30a releases another end of the actuator 4 (step 76) to change over the clamp operation and a voltage corresponding to $\Delta Z$ is applied to the Z coarse actuator 4 (step 77). Then, clamp of A (step 78) and release of B (step 79) are carried out to return the state to the original state and thereafter the application voltage to the Z coarse actuator 4 is made zero. If $\Delta Z$ is judged to be negative by the judgement step 74, it means that the elongation of the Z coarse actuator 4 at the point of time at which the tunnel current $I_t$ starts flowing is greater than the center value (reference value) of the movable range of the actuator 4. This represents that the operations opposite to the flow 75–80, that is, the elongation of the actuator by a distance corresponding to $\Delta Z$, are necessary. Therefore, the Z coarse actuator 4 is extended by $\Delta Z$ (step 81), and clamp of B (step 82) and release of A (step 83) are carried out to change over the clamp work of the hold systems. Thereafter the elongation of the coarse actuator 4 is returned to zero (step 84) and clamp of A (step 85) and release of B (step 86) are set back so that the end of the actuator 4 near the sample 2 becomes free. In this manner, a system for normalizing the inch worm system (the flow of steps 72 to 86) is used to extend gradually the Z coarse actuator 4 (step 87), after the start of the flow of the tunnel current $I_t$ is confirmed (step 88), the actuator 4 is extended continuously until the elongation of the Z-direction fine actuator 4 reaches the center (or the set reference point) of the movable range of this actuator 4, and when it reaches the center of the movable range (step 89), the application voltage is kept as it is (step 90) and the double loop system is operated (or the switch 36 is set to ON; step 91). Needless to say, the flow of the steps 72 to 86 may be omitted if it is only necessary in FIG. 8 to draw automatically the sample 2 toward the probe-tip 1, that is, if it is not necessary to set the operation point of the Z coarse actuator 4 to the center of its movable range. It is also possible to eliminate the OFF and ON steps of the double servo system (steps 61 and 91) at some sacrifice of accuracy.

Figure 9:
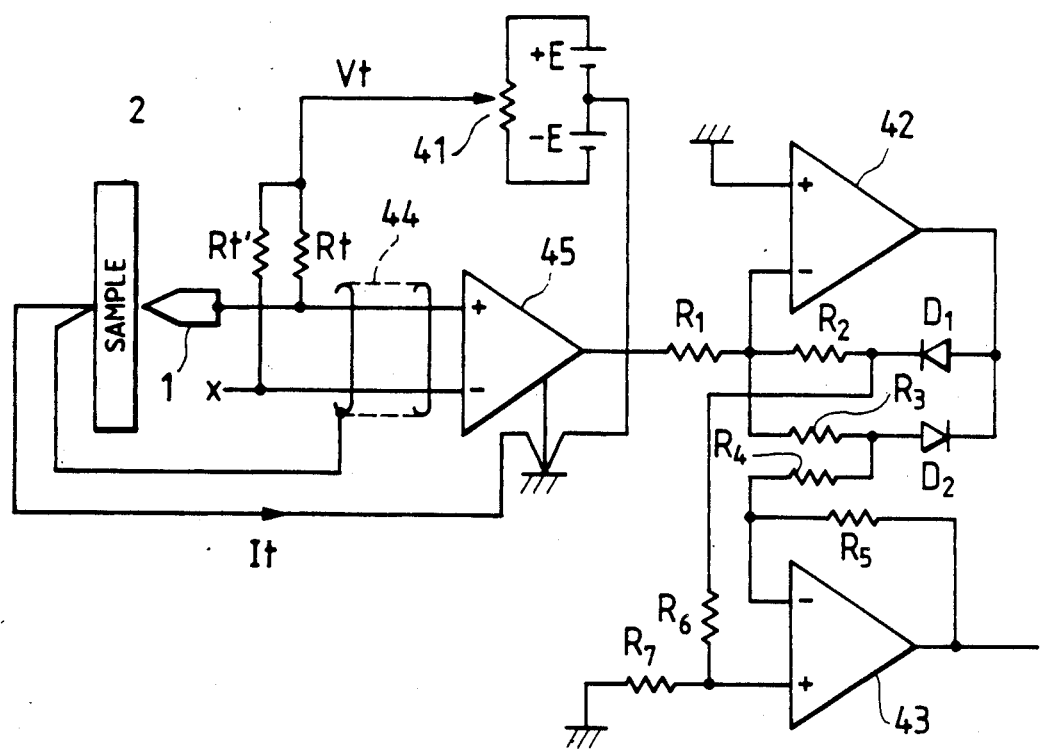
FIG. 9 is a tunnel current detection circuit diagram.

FIG. 9 is a circuit diagram embodying the measuring amplifier 39 for amplifying the detection current (or other physical parameters such as a pressure, capacitance, temperature, optical quantity, etc.) in the block diagram shown in FIG. 5. The polarity of the tunnel application voltage $V_t$ may preferably be a positive potential or a negative potential depending on the surface condition of the sample 2, and this application voltage $V_t$ can be set to an arbitrary positive or negative value by a potentiometer 41. Operational amplifiers 42 and 43 constitute an absolute value circuit for the polarity conversion described above. The tunnel voltage $V_t$ is applied between the sample 2 and the probe-tip 1 through a detection resistor $R_t$. The junction between $R_t$ and the probe-tip 1 and the lead wire of a dummy resistor $R_t'$ disposed near $R_t$ are connected to the +input and −input of the differential amplifier 45 by two-core shielded wires 44, and the signal component from which common mode noise such as AC induction is removed is outputted from this amplifier 45, is detected by $D_1$ and $D_2$ and turned to an absolute value output (only the output in the positive direction is shown in the diagram) by the operational amplifier 43. Here, $R_1$ to $R_7$ have the same value. If the tunnel voltage $V_t$ has only one polarity, the absolute value circuit consisting of the operational amplifiers 42, 43 can be omitted.

In the block diagram of the third embodiment shown in FIG. 5, the probe-tip scan speed can be improved by inserting the correction value for the inclination of the sample or the like, that has been measured in advance, to the ON side contact of the switch 36 and using this loop as a feed forward system.

Embodiment 4

Figure 10:
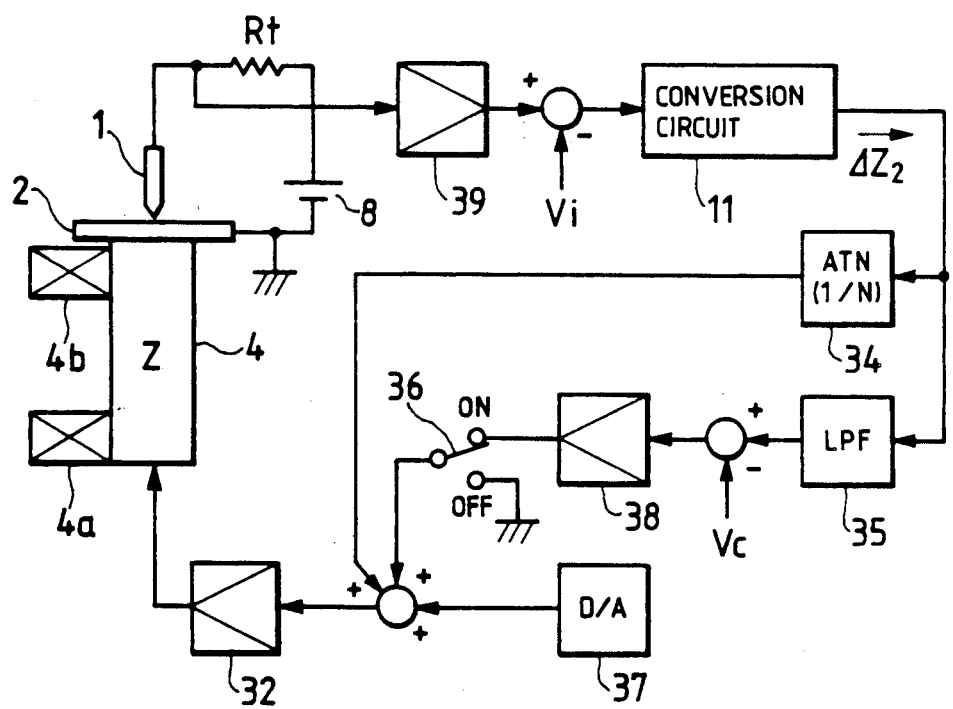
FIG. 10 is a configuration of one embodiment of the present invention.

FIG. 10 shows the fourth embodiment of the present invention which omits the Z-direction fine actuator 7 of the third embodiment but provides the Z-direction coarse actuator 4 with the fine movement function. The difference of this circuit from the circuit shown in FIG. 5 lies in that the fine actuator 7 is not used, and that the output signal $\Delta Z_2$ of the conversion circuit 11 is attenuated by the attenuator circuit 34 and is added further to the addition value of the output signal of the switch 36 and the output signal of the D-A converter 37 to drive the piezo driver 32. The rest of the circuit configuration is the same as that shown in FIG. 5. In this fourth embodiment, the Z coarse actuator 4 having a large movable range is used also as the fine actuator to constitute the double servo system having different frequency bands. Accordingly, though resolution somewhat drops due to the hysteresis property specific to the piezo actuator, it is possible to avoid the problems such as the impingement or excessive separation of the sample 2 and the probe-tip 1 using the same mechanical structure. The drop of resolution can be prevented to some extent by adding further a hysteresis correction circuit into the loop.

The low frequency component application voltage to the Z-direction fine actuator detects the change of the relative position between the sample and the probe-tip resulting from the inclination of the sample or thermal factor. Accordingly, the servo loop having the Z-direction coarse actuator having a large movable range operates so that the mean gap between the sample and the probe-tip becomes constant and can easily observe and measure the sample surface over a wide range.

Embodiment 5

Generally, in apparatuses such as the scanning tunneling microscope (STM) or the like, the trajectory of the probe-tip in the vertical direction is displayed as the gray scale display, the topographic display or the contour display by digitizing the trajectory signal of the probe-tip in the vertical direction, then storing it in a memory and after computer processing is made, whenever necessary, converting the digitized signal to the analog signal for monitor displaying, though this procedure is omitted in the description of the embodiment shown in FIG. 1.

Figure 11:
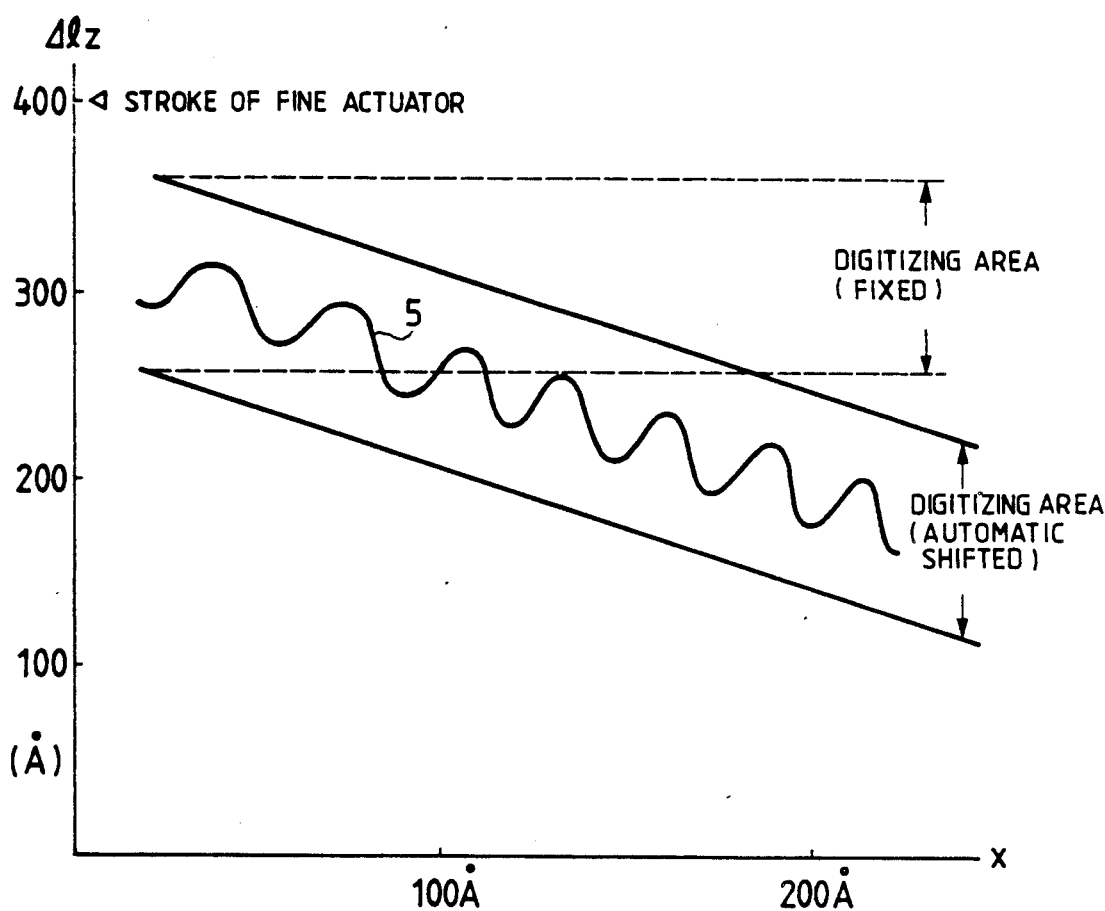
FIG. 11 is a configuration of digitization.

FIG. 11 is a view for explaining the concept of digitization. The ordinate represents the fine moving distance ($\Delta$1Z) of the Z-direction fine actuator and the abscissa represents the scan distance in the X (or Y) direction. The drawing shows the Z-direction trajectory 5 of the probe-tip as a result of the scanning operation. The vertical movement in the form of a small sinusoidal wave represents the corrugation state on the surface of the sample to be measured and the trajectory waveform 5 inclines rightwardly downward as a whole. This represents that the inclination or distortion of the sample exists in an extreme case. Since it is a primary object to examine (observe), the relationship between the small valley and the small peak of the trajectory waveform, the digitization range may be set in such a manner that the peak becomes the upper limit and the valley is the lower limit, in order to obtain the highest resolution. (For example, for 8-bit digitization, if the digitization range is 100 the minimum digitization unit is 0.39 and if the digitization range is set to 10 Å, the minimum digitization unit is 0.039 Å) If the waveform is shifted as a whole as in the case of the waveform 5 shown in the drawing, the set range of the digitization range must be expanded so that the drop of resolution is unavoidable.

This embodiment provides a surface metrological apparatus which can observe the sample over a wide range without interruption or nullification of data collection and without the drop of resolution.

This embodiment is characterized in that the digitization range is automatically shifted by detecting the shift quantity of the waveform 5 in order to prevent the drop of resolution.

More definitely, the low frequency component of the application voltage to the fine actuator is applied as the offset voltage of a data digitization circuit.

Figure 12:
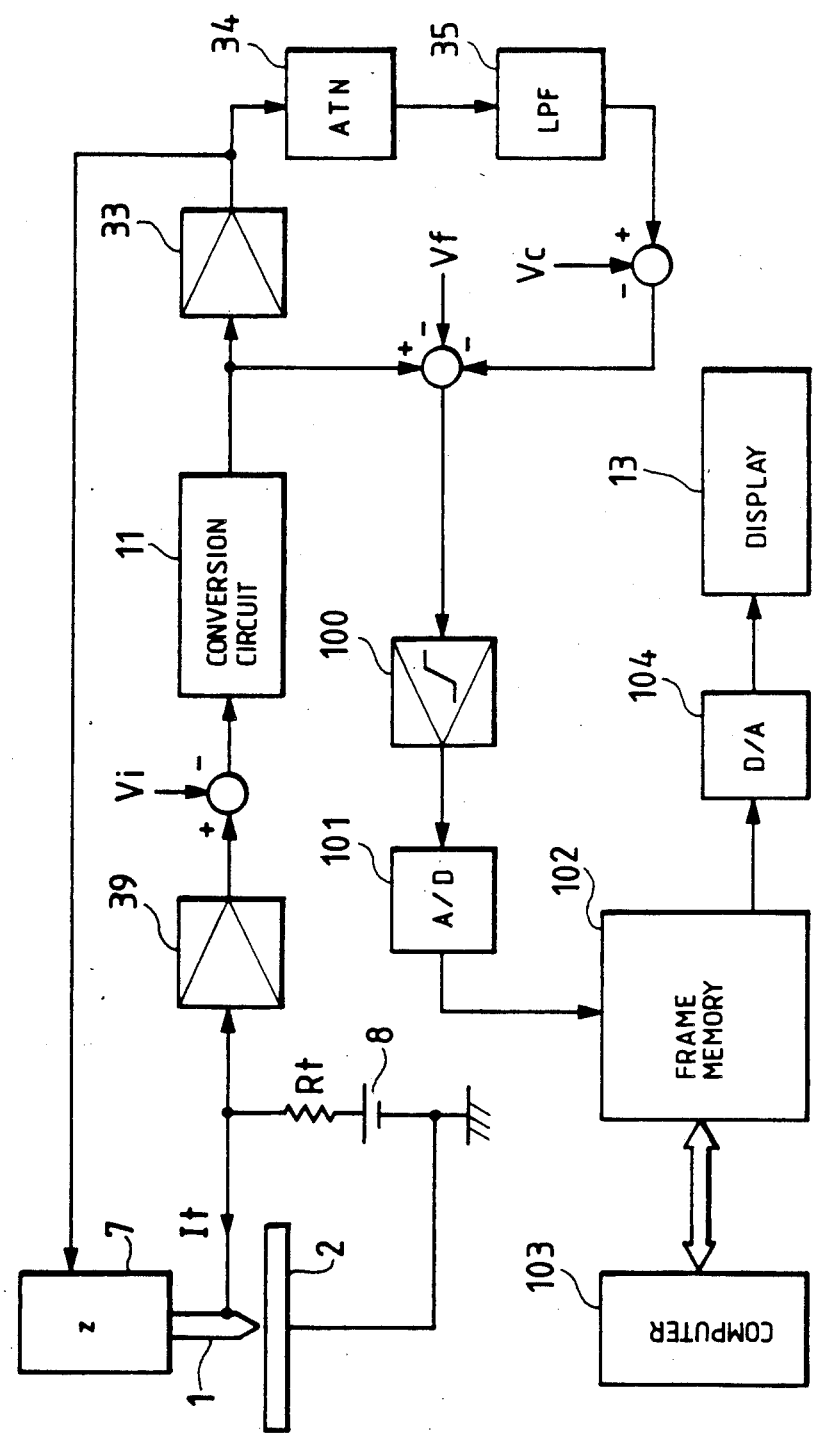
FIG. 12 is a structural view of one embodiment of the present invention.

FIG. 12 is a block diagram of this fifth embodiment. The tunnel voltage 8 is applied between the probe-tip 1 and the sample 2 through the detection resistor $R_t$, and the tunnel current $I_t$ component is amplified by the amplifier 39, subtracted by the reference current value $V_i$ and the result is converted by the conversion circuit 11 to the gap information to drive the Z-direction fine actuator 7 through the piezo driver 33 so that the current $I_t$ becomes constant. On the other hand, the gap signal output of the conversion circuit 11 is subtracted by the offset voltage $V_f$ and the difference signal becomes the input signal to the A-D converter 101 through a clipper amplifier 100. In order to cancel the shift component of the low frequency wave, the output of the piezo driver 33 is attenuated by the attenuator 34 and the signal component frequency to be observed is removed by the low-pass filter 35. The difference component obtained by subtracting the target stretch voltage $V_c$ of the Z actuator 7, that is, the shift component from the initial value, is subtracted from the input signal to the clipper amplifier 100 so that the digitization range is shifted automatically. Incidentally, the digitial data converted by the A-D converter 101 is sequentially stored in a two-dimensional memory (frame memory) 102 and image processing is made by a computer 103, whenever necessary. The signal is then converted to the analog signal by use of a D-A converter 104 and outputted to the display 13 such as the monitor television or an X-Y plotter.

The fifth embodiment described above can observe and measure the surface condition of those samples which have a relatively large area but whose surface accuracy is very high such as a silicon wafer with sub-angstrom resolution (Å=10− m).

Embodiment 6

When the probe-tip is allowed to approach the sample or when the observation area is selected, the probe-tip must not impinge against the same. This embodiment is directed to prevent this problem.

A probe-tip moving means of this embodiment consists of a plurality of moving means. Namely, servo control is made by first moving means by use of physical parameters obtained when the probe-tip and the sample are moved closer to each other, so that the gap between the probe-tip and the sample is kept constant. Second moving means moves the probe-tip toward the sample or selects the observation area. Accordingly, the probe-tip can approach the sample or can move inside the sample plane without impinging against the sample, and the physical parameters that can be obtained when the probe-tip approaches the sample can be obtained stably with high spatial resolution.

Figure 13:
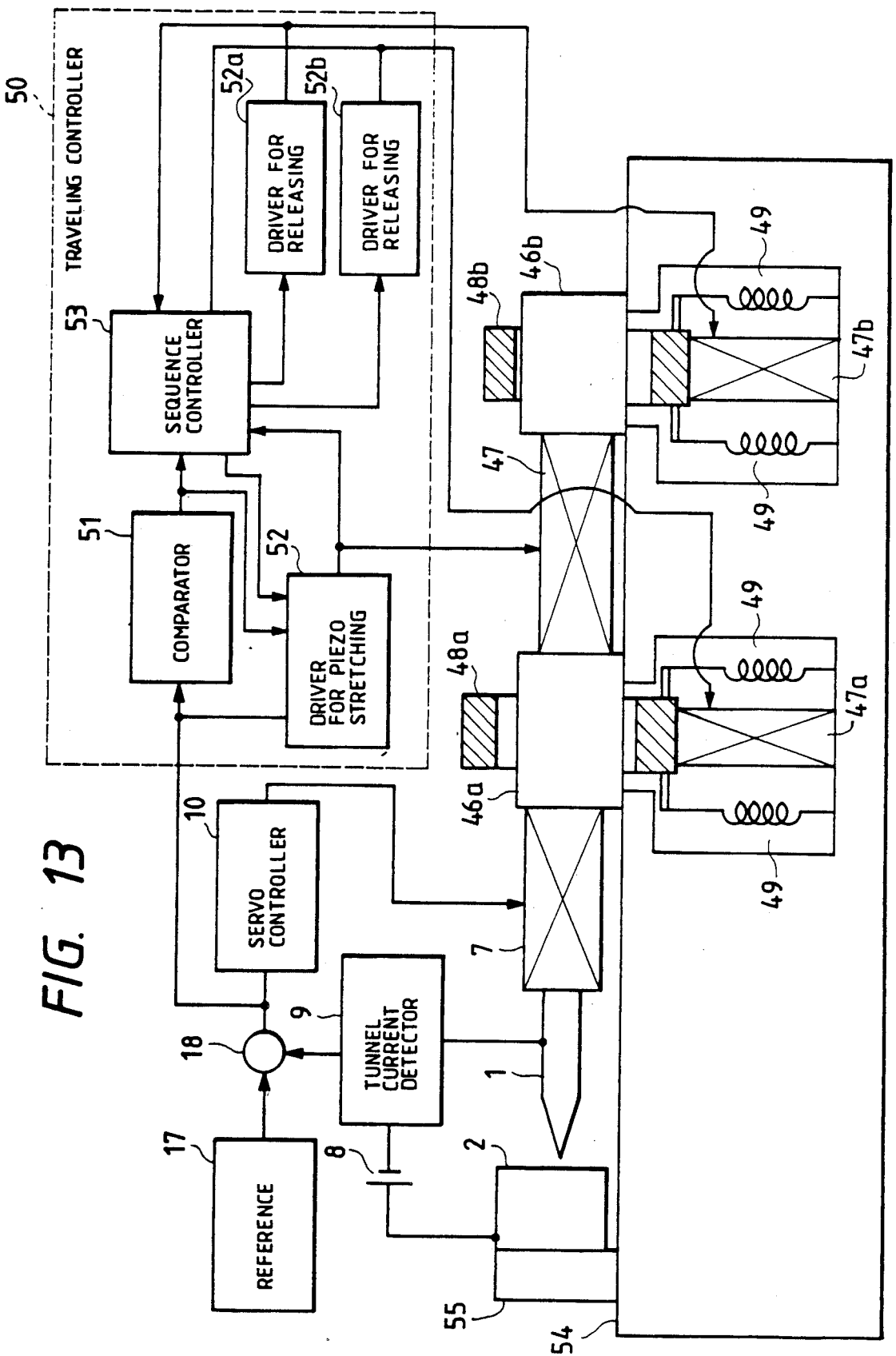
FIG. 13 is a block diagram for explaining the approach between the probe-tip and the sample in STM in one embodiment of the present invention.

FIG. 13 shows the fundamental structure of this embodiment. The drawing illustrates the case where the sample 2 and the probe-tip 1 are moved closer to each other in the scanning tunneling microscope (STM) for controlling the gap between the sample 2 and the probe-tip 1 by the tunnel phenomenon by bringing the sample 2 and the probe-tip 1 close to one another. The moving means in this embodiment consists of a gap control device (piezo device) 7 as the first moving means for supporting the probe-tip 1 and an inchworm system as the second moving means for supporting the piezo device 7. This inchworm system comprises the moving unit consisting of a terminal 46a for supporting the gap control device 7, a contraction piezo device 47 and a terminal 46b, and two clamp units consisting of clamp metals 48a, 48b, clamp piezo devices 47a, 47b and springs 49. The release of the clamp units is made by applying a voltage the clamp piezo devices 47a, 47b to raise the clamp metals 48a, 48b. This embodiment allows the sample 2 to approach the probe 1 in the following circuit configuration by use of these two moving means.

The circuit consists primarily of a gap control circuit and a traveling control circuit 50. The gap control circuit is used in STM and consists of a tunnel power source 8, a tunnel current detection circuit 9, a reference setting circuit (tunnel current) 17, a differential circuit 18 and a servo control circuit 10. On the other hand, the traveling control circuit 50 consists of a current detection circuit 51, a piezo drive circuit for stretching a piezo device 47 for inchworm movement, a sequence control circuit 53 and clamp drive circuits 52a, 52b. Reference numeral 54 represents a table and 55 a sample bed.

Figure 14A:
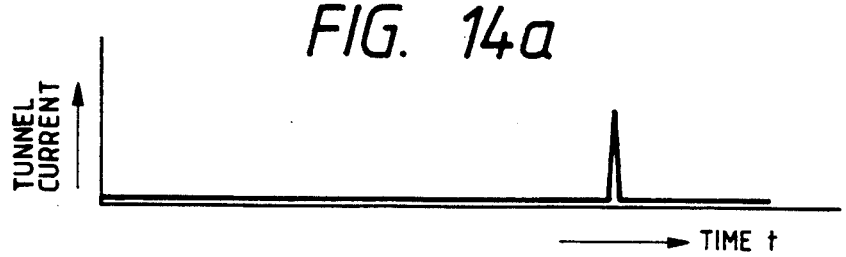
FIGS. 14a-14d are time charts for explaining the operation of FIG. 13.
Figure 14B:
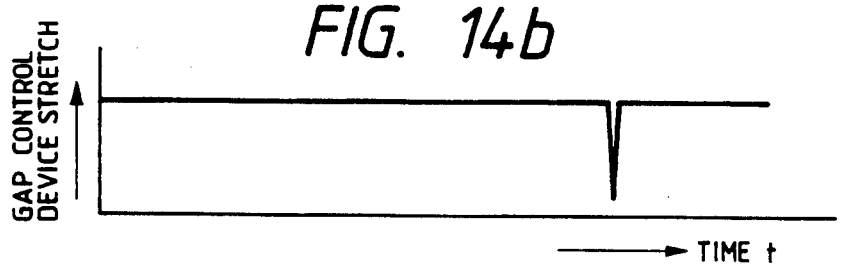
Figure 14C:
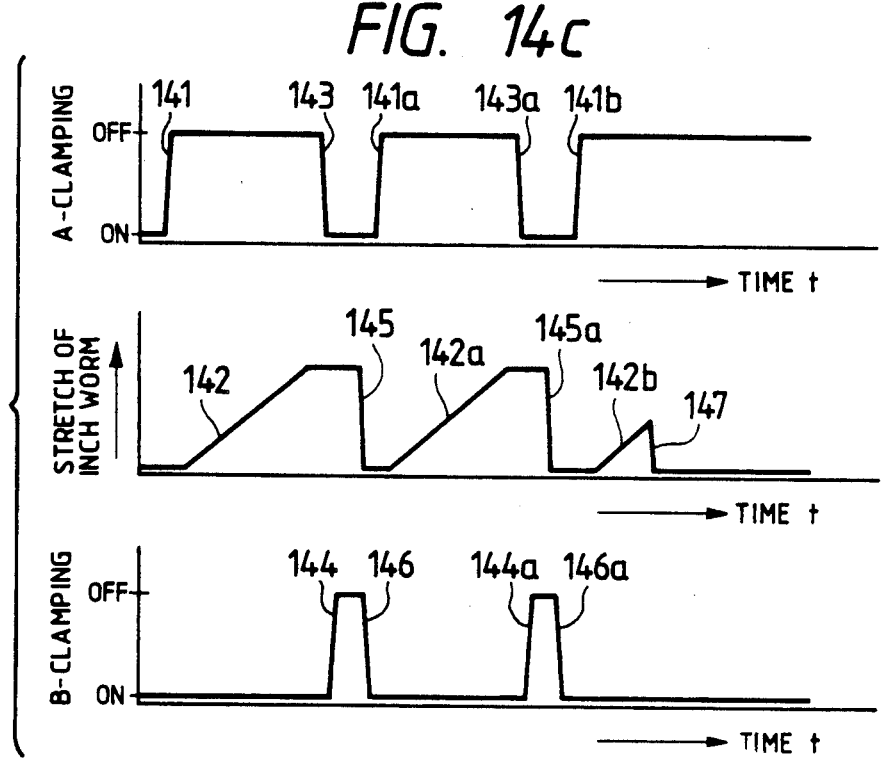

According to the moving means and control system described above, the probe-tip 1 can approach the sample 2 without impingement in the following manner. FIG. 14c shows a time chart for control.

First of all, the sample 2 is set in the spaced-apart relation from the probe-tip 1 and the servo control circuit 10 is operated. Since no tunnel phenomenon develops, however, the tunnel current does not flow and the stretch distance of the gap control device 7 becomes maximal. Under this state the traveling control circuit 50 is driven so as to allow the probe-tip 1 to approach the sample 2. The sequence control circuit 53 drives the clamp drive circuit 52a and the clamp metal 48a is pushed up by the clamp piezo device 47a to release the clamping of the terminal 46a (the operation of 141). Incidentally, the sequence control circuit 53 monitors the output of the clamp drive circuit 52a and proceeds to the next operation when the output voltage sufficiently reaches the set value.

This operation is carried out in the same way when the clamp piezo devices 47a, 47b and the stretch piezo device 47 stretch or contract. After the clamping of the terminal 46 is released, the stretch drive circuit 52 is driven by use of the output of the differential circuit 18 to stretch the stretch piezo device 47 (the operation of 142). After this operation is complete, the terminal 46a is clamped (the operation of 143), the clamp of the terminal 46b is released (the operation of 144), the stretch piezo device 47 is contracted (the operation of 145) and furthermore, the terminal 46b is clamped (the operation of 146). In this manner the probe-tip 1 is brought closer to the sample 2. However, since the probe-tip 1 is not sufficiently near to the sample as to generate the tunnel phenomenon, each device operates going through the operations 141a, 142a, 143a, 144a, 145a and 146a. Thereafter the operations proceed to 141b and 142b and when the tunnel current flows, the current detection circuit 51 operates to set the output voltage of the stretch drive circuit 52 to zero, that is, the state returns to the state, where the stretch drive circuit 52 does not stretch the operation of 147. Automatic approach is completed while the release of the clamping of the terminal 46a is kept as such. For, if the terminal A46a is clamped, the tip of the probe-tip 1 moves so that there is the danger of the impingement of the probe-tip 1 against the sample 2. Thereafter, it is preferred that the stretch piezo device 47 is stretched gradually by the manual operation and the probe-tip is moved forward so as to obtain the tunnel current. Since the tunnel phenomenon occurs at the gap of about 10 Å, the operation of 147 must be carried out rapidly. If the moving speed of the inchworm system is 10μm/s, for example, response of 0.1 ms is necessary. Generally, since the piezo device is driven at about 100V, the operational amplifier having a high speed response cannot be used. For this reason, the present invention operates the gap control circuit. Namely, when the tunnel current starts flowing as shown in FIGs. 14a and 14b, the gap control device 7 contracts simultaneously to quicken the slow response described above. Furthermore, since the output signal of the differential circuit 18 is used as the input signal of the piezo driving circuit 52, the stretch speed of the stretch piezo device 47 is extremely reduced simultaneously with the flow of the tunnel current and the piezo device starts contracting, on the contrary. Therefore, it quickens the slow response in the same way as described above.

FIG. 15 shows an example of the traveling control circuit 50. The diagram shows in further detail part of FIG. 13. The traveling control circuit 50 is for driving the stretch piezo device 47. Here, the tunnel phenomenon occurs in the range of the gap of up to 10 Å, and the piezo device stretches preferably at a constant speed. Therefore, the embodiment represents the case where a millor integrator is used for part of the piezo drive circuit 52 for stretching. The speed is determined by $1/CR_2$. When the output of the differential circuit 18 changes from positive to negative after the detection of the tunner current, the output of a flip-flop circuit 151 goes "High", discharges the capacitor C of the millor integrator by means of a relay 153 through an OR circuit 152 and makes the output zero.

Incidentally, it is possible to use, as the input signal to the current detection circuit 51, the signal inside the tunnel current detection circuit 9 or the servo circuit 10 besides the output signal of the differential circuit 18. Reference numerals 154 to 157 represent operational amplifiers and symbols $R_1$–$R_5$ represent resistors. Reference numeral 17 represents a reference tunnel current setting circuit.

Figure 16:
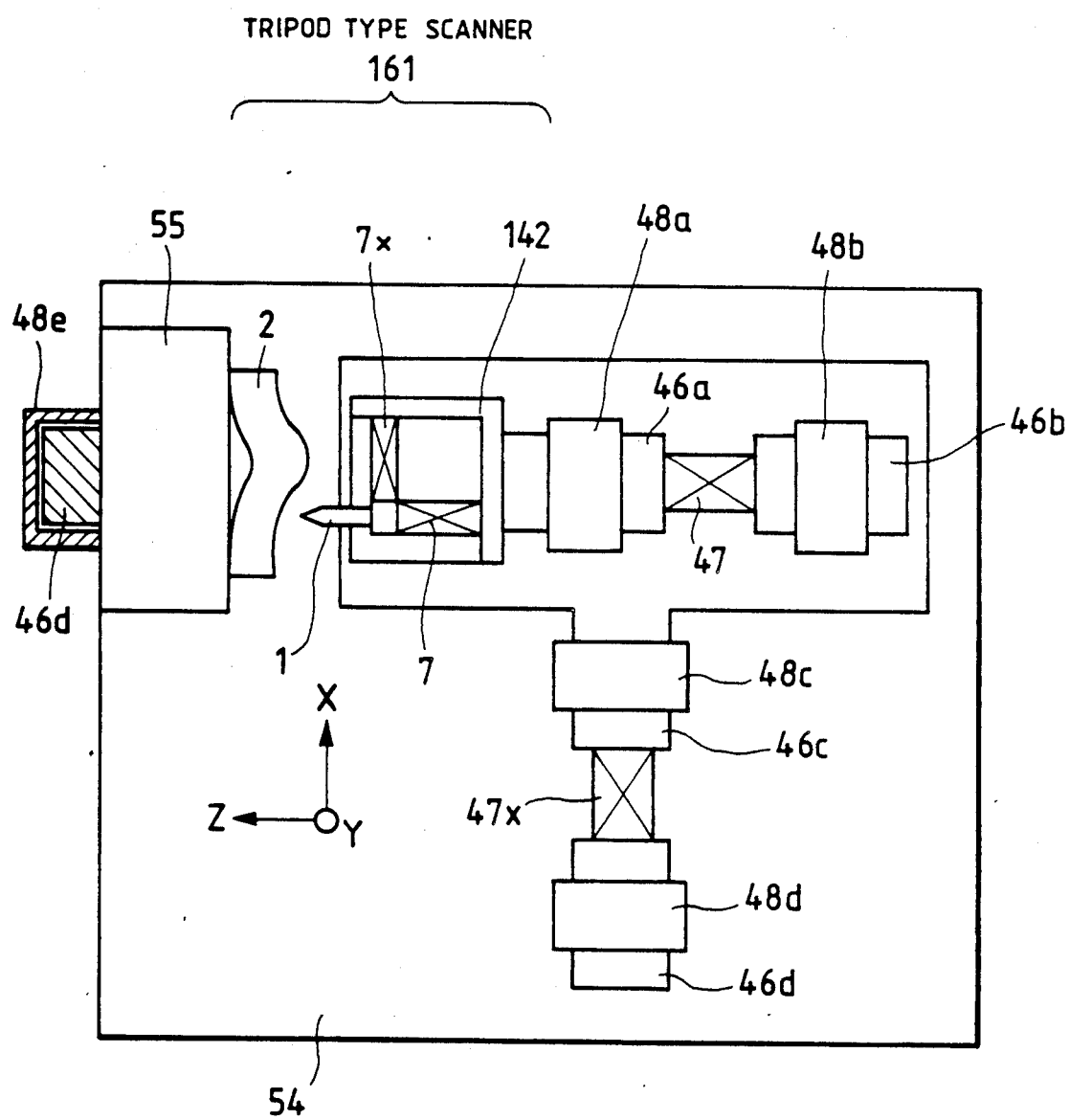
FIG. 16 is a plan view of STM having a 3-dimensional inchworm system.

FIG. 16 is a plan view of STM having a three-dimensional coarse moving system which enables the selection of the observation area. The coarse moving system is obtained by expanding the inchworm system shown in FIG. 13 to a three-dimensional system. In the drawing, the movement of the probe-tip in the X- and Y-directions is effected by clamp metal 48c, terminal (upper table) 46c, X-axis stretch piezo device 47x, clamp metal 48d and terminal 46d in the X-direction and by clamp metal 48e and terminal 46d in the Y-direction. The moving system in the Z-direction is the same as the one shown in FIG. 13. Incidentally, clamp metals, terminals and stretch piezo devices corresponding to the piezo device for clamping and the components for the Y-direction shown in the drawing are omitted from the drawing, but they operate in exactly the same way as those of the inchworm system in the Z-direction. Here, a tripod type scanner 161 capable of three-dimensional operation in X, Y and Z directions is used as the moving means for supporting the probe-tip 1. In this moving means, the Z-axis piezo device 7, the piezo device 7x for X-axis scanning and the piezo device for Y-axis scanning (not shown) are disposed on the seat 142 connected to the terminal 46a as shown in the drawing and operate in such a manner as to obtain the STM image. When the probe-tip 1 is moved in the X-direction in order to select the observation area in the drawing, the probe-tip 1 and the sample 2 impinge if any corrugation of the sample 2 exists and the tip portion of the probe-tip 1 becomes curved so that the drop of the planar resolution occurs or the tunnel current gets unstable. To prevent these problems, the inchworm system in the X-direction preferably moves under the same system as the one form moving the probe-tip 1. Incidentally, it is more convenient to provide a display notifying the impingement and setting and display means of the number of steps. The inchworm system in the Y-direction, too, is preferably moved under the same system as the one described above. Furthermore, when the tunnel current is detected, the selection of the observation area in the X- or Y-direction may be continued by moving back the system by the Z-direction moving means.

Figure 17:
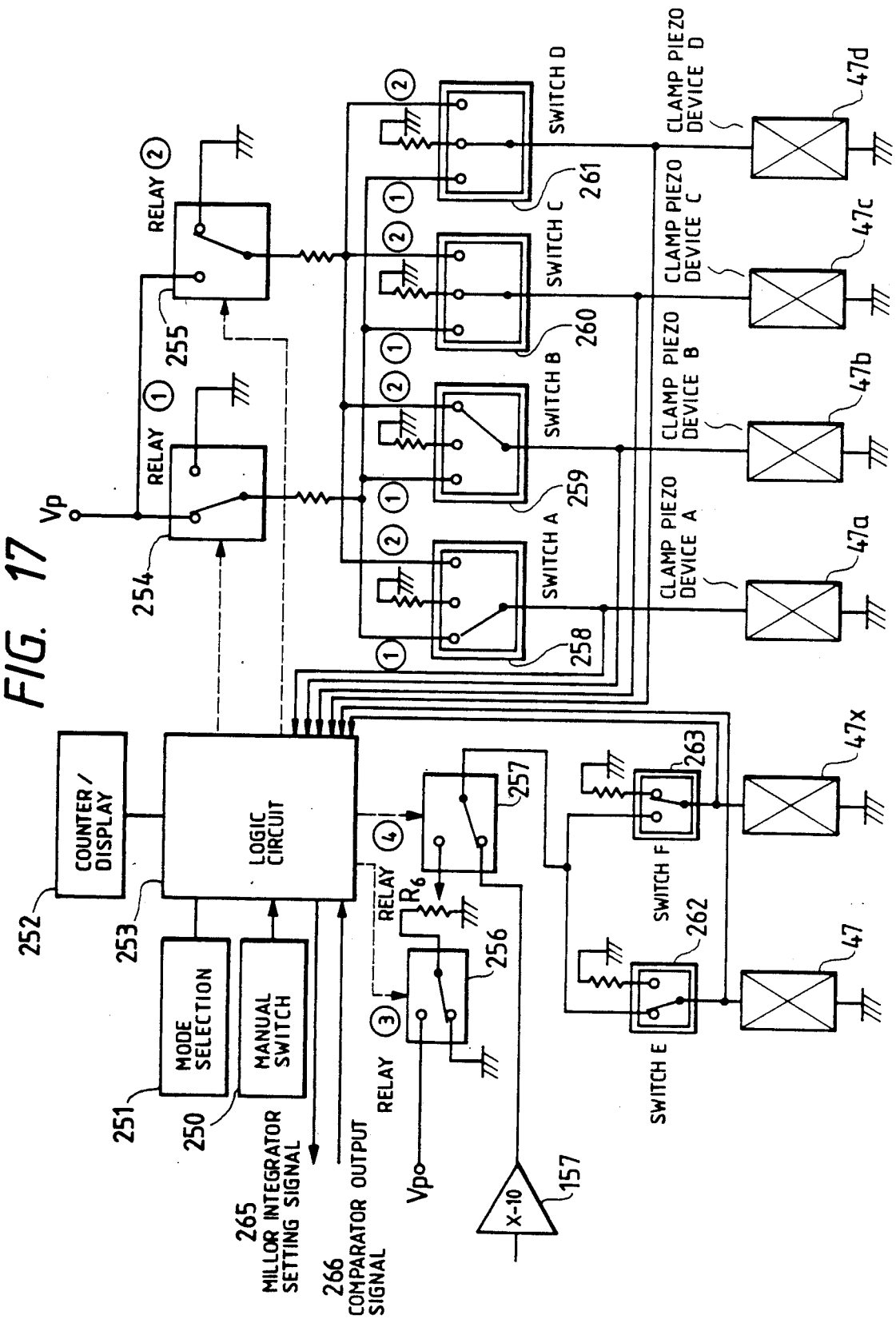

FIG. 17 shows part of the traveling control circuit 50 for driving the Z-axis inchworm system for approach and the X-axis inchworm system for selecting the observation area. Through each inchworm system may be provided with its own control circuit, the approach and the selection of the observation area are not generally carried out simultaneously. Therefore, it is convenient to use commonly one driving circuit. In the drawing, relays ①254 and ②255 are for driving the clamp piezo drive devices 47a –47c. Relay ③256 is for stretching the stretch piezo device of the inchworm system by applying a step voltage thereto and relay ④257 is for the automatic approach and for the visual field selection. These relays operate in accordance with the mode selection. Switches A 258, B 259, C 260 and D 261 select whether the voltage to be applied to the clamp piezo devices 47a –47d is the voltage designated by the relay ①254, the voltage designated by the relay ②255 or is set to the clamp state. Switches E 262 and F 263 select whether the devices are driven by the voltage designated by the relays ③256 and ④257 or are not driven. Manual switches may be used sufficiently as these six switches. The sequence control of the inchworm system is carried out by a logic circuit 253. A firmware, a microprocessor or a computer is utilized as this logic circuit 253. Counter/display means 252 displays the number of steps and the number of impingements. Mode selection 251 can select (i) automatic approach and automatic visual field selection, (ii) inchworm movement with the designated number of steps and (iii) manual operation.

In the case of (i), the relay ④257 is set as shown in the diagram to operate the relays ①254 and ②255 and at the same time, the operation shown in FIG. 14c is conducted by the reset signal 265 of the millor integrator (shown in FIG. 15). Incidentally, the reset signal 265 of the millor integrator is used for the operation of 145 shown in FIG. 14c. The condition of the switches A 258–F 263 represents the case of automatic approach. All the switches A 258, B 259 and E 262 are grounded and selection is made so as to connect the switch C 260 to the relay ①, the switch D 261 to the relay ②255 and the switch F 263 to the relay ④257, whereby the selection of the visual field in the X-direction in FIG. 16 is conducted. If it is desired to move in the opposite direction, the switch selection of the switches A 258 –D 261 may be reversed. Incidentally, sequence the may be changed by the logic circuit 253.

In the mode (ii), the number of steps is designated and the terminal is changed over so as to connect the relay ④257 to the constant voltage Vp and to make high speed inchworm movement. This is effective when there is no possibility of impingement between the probe-tip 1 and the sample 2. At this time the application voltage to the stretch piezo device 47 or the X-axis stretch piezo device 47x is selected to be the constant voltage or 0V by the relay ③256. In the mode (iii), the selection is made by the manual switch 250 so as to operate the relays ①254, ②255 and ③256, or all of them are connected to the current detection signal 266 and the operation is made by the switches A 258 –F 263. The relay ④257 is under the same state as in the mode (ii). On the other hand, it is possible to stretch gradually the stretch piezo device 47 after automatic approach in the manual mode while the terminal 46a is kept released by use of the resistor R6 until the tunnel current starts flowing and to approach the probe-tip 2 to the sample so as to obtain the STM image. Incidentally, the current detection signal 266 is the output signal of the operational amplifier 154 shown in FIG. 15. Though FIG. 17 shows the control of the two-axis inchworm system, the traveling control circuit can be constituted similarly for many movements or modified inchworm systems such as when the number of clamps and stretch devices are more than one. The level of the application voltage to the piezo device is utilized as the sequence control signal of the logic circuit 253. In this case, since the voltage to the device is high, it is preferably divided by a resistor for use as the control signal or a delay circuit is preferably disposed int eh estimation of a settling time after level comparator so as to control the sequence. Incidentally, in the mode (i), noise will mix in the tunnel current when the probe-tip 1 approaches the sample 2 and will result in an erroneous operation. Therefore, it is important to make programming so that when the operation of 142b in FIG. 14c is repeated a plurality of times and the tunnel current is detected continuously, the operation is stopped.

Figure 14D:
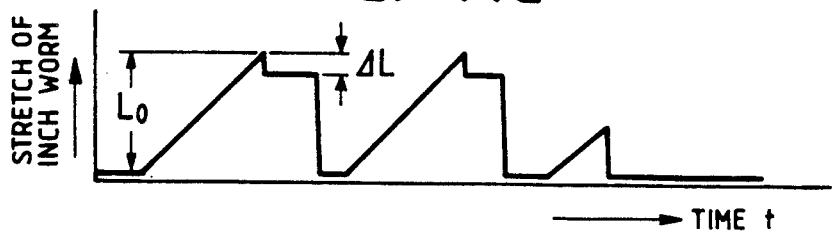

On the other hand, if the inchworm system is used, the probe-tip 1 sometimes moves forward and impinges against the sample 2 at the time of clamping. This problem can be solved by making the contraction/stretch distance of the inchworm system greater than the step as shown in FIG. 14d. In other words, it is important that after the stretch distance Lo is set as shown in FIG. 14d, it is reduced by ΔL so as to reduce the step.

Though the moving means described above uses the piezo device, the same action as described above can be obtained by using an electrostatic chucking for the clamp system or by utilizing a piezoelectric device, a magnetostriction device or thermal expansion in place of the piezo device. It is also possible to employ an approaching method by motor driving using a screw and a reduction mechanism besides the inchworm system described above. In such a case, the gap control may be made by use of the physical parameters obtained by the approach of the probe-tip 1 to the sample 2 as in this embodiment and at the same time, the motor driving may be made by the signals used in this control system. In this case, if the embodiment is constructed in such a manner that when a physical parameter having a predetermined value is detected, the movement is stopped. According to this construction, an arbitrary gap corresponding to the predetermined physical parameter can be secured between the probe-tip and the sample.

Although the foregoing embodiments deal with STM where the tunnel current is used as the physical parameter, atomic force, surface temperature of the sample, capacitance, flux, magnetic force, and the like, may be used as the physical parameter. The present invention can apply to all those apparatuses (scientific apparatuses such as microscopes, recorders, and the like) which utilize such parameter information. The travelling system may be of course support either the probe-tip or the sample.,

Industrial Applicability

The present invention provides a surface metrological apparatus capable of measuring the sample surface over a wide range with high resolution wherein topographical information of a sample can be obtained by utilizing physical parameters such as a tunnel current and field emission that occurs when a probe-tip and a sample are allowed to approach each other.

We claim:

1. A surface metrological apparatus comprising:
   means for supporting a sample;
   a probe-tip;
   means for applying a voltage between the probe-tip and the sample to cause a current to flow therebetween;
   means for moving the probe-tip to approach the sample;
   servo means for controlling the moving means to adjust a gap between the probe-tip and the sample so that the current flowing between the probe-tip and the sample is substantially equal to a predetermined reference current;
   means for scanning the probe-tip over a surface of the sample, the scanning of the probe-tip over the surface of the sample causing the current flowing between the probe-tip and the sample to fluctuate from the reference current;
   means for obtaining information about the surface of the sample on the basis of the current flowing between the probe-tip and the sample; and
   means for correcting the information about the surface of the sample on the basis of the fluctuation of the current flowing between the probe-tip and the sample from the reference current.

2. A surface metrological apparatus according to claim 1, wherein the current flowing between the probe-tip and the sample is a tunnel current or a field emission current.

3. A surface metrological apparatus comprising:
   means for supporting a sample;
   a probe-tip;
   three-dimensional moving means, comprising horizontal scanning means, vertical scanning means, a coarse actuator for coarse adjustment of a distance between the probe-tip and the sample, and a fine actuator for fine adjustment of the distance between the probe-tip and the sample, for changing a positional relationship between the probe-tip and the sample;
   means for applying a voltage between the probe-tip and the sample to cause a current to flow therebetween;
   means for generating a fine actuator drive signal for controlling the fine actuator to finely adjust the distance between the probe-tip and the sample so that current flowing between the probe-tip and the sample is substantially constant;
   means for extracting a low-frequency component of the fine actuator drive signal;
   means for generating a coarse actuator drive signal for controlling the coarse actuator to coarsely adjust the distance between the probe-tip and the sample on the basis of the low-frequency component of the fine actuator drive signal; and
   means for obtaining information about a surface of the sample on the basis of movement of the fine actuator.

4. A surface metrological apparatus comprising:
   means for supporting a sample;
   a probe-tip;
   three-dimensional moving means, comprising horizontal scanning means, vertical scanning means, a coarse actuator for coarse adjustment of a distance between the probe-tip and the sample, and a fine actuator for fine adjustment of the distance between the probe-tip and the sample, the changing a positional relationship between the probe-tip and the sample;
   means for applying a voltage between the probe-tip and the sample to cause a current to flow therebetween;
   means for generating a fine actuator drive signal for controlling the fine actuator to finely adjust the distance between the probe-tip and the sample so that the current flowing between the probe-tip and the sample is substantially constant;
   means for extracting a low-frequency component of the fine actuator drive signal;
   means for generating a coarse actuator drive signal for controlling the coarse actuator to coarsely adjust the distance between the probe-tip and the sample on the basis of the low-frequency component of the fine actuator drive signal;
   a memory for storing a change of the distance between the probe-tip and the sample over a two-dimensional area or an anticipated error;
   means for forward controlling the coarse actuator on the basis of an output of the memory; and
   means for obtaining information about a surface of the sample on the basis of movement of the fine actuator.

5. A surface metrological apparatus according to claim 3 or 4, further comprising means for automatically moving the probe-tip to approach the sample by controlling the coarse actuator so that the probe-tip is set to a predetermined point within a movable range of the fine actuator.

6. A surface metrological apparatus comprising:
   means for supporting a sample;
   a probe-tip;
   three-dimensional moving means, comprising horizontal scanning means, vertical scanning means, and a fine actuator for fine adjustment of a distance between the probe-tip and the sample, for changing a positional relationship between the probe-tip and the sample;
   means for applying a voltage between the probe-tip and the sample to cause a current to flow therebetween;
   means for controlling the fine actuator to finely adjust the distance between the probe-tip and the sample so that the current flowing between the probe-tip and the sample is substantially constant;
   means for obtaining information about a surface of the sample on the basis of movement of the fine actuator;
   means for digitizing the information about the surface of the sample on the basis of offset information;
   means for extracting a low-frequency component of the movement of the fine actuator; and
   means for providing the low-frequency component of the movement of the fine actuator to the digitizing means as the offset information.

7. A surface metrological apparatus according to any of claims 3, 4, and 5, wherein the means for obtaining information about the surface of the sample comprises means for obtaining the absolute value of the current flowing between the probe-tip and the sample.

8. A surface metrological apparatus comprising:
   means for supporting a sample; a probe-tip for detecting a physical parameter;
   three-dimensional moving means, comprising horizontal scanning means, vertical scanning means, and height adjusting means, for changing a positional relationship between the sample and the probe-tip;

control means for generating a drive signal for controlling the height adjusting means so that the physical parameter detected by the probe-tip substantially constant; and means for obtaining information about a surface of the sample on the basis of the drive signal;

wherein the height adjusting means comprises coarse height adjusting means and fine height adjusting means; and wherein the control means comprises means for extracting a high-frequency component of the drive signal and a low-frequency component of the drive signal, means for driving the coarse height adjusting means on the basis of the low-frequency component of the drive signal, and means for driving the fine height adjusting means on the basis of the high-frequency component of the drive signal.

9. A surface metrological apparatus comprising:

means for supporting a sample;

a probe-tip;

means for changing a positional relationship between the probe-tip and the sample; and means for detecting a physical parameter corresponding to a gap between the probe-tip and the sample;

wherein the means for changing a positional relationship between the probe-tip and the sample comprises:

first moving means for preventing impingement of the probe-tip on the sample;

second moving means for coarsely changing the positional relationship between the probe-tip and the sample;

a servo control circuit for controlling the first moving means on the basis of the physical parameter detected by the detecting means so as to keep the gap between the probe-tip and the sample constant; and a driving circuit for driving the second moving means;

wherein the driving circuit stops driving the second moving means when the physical parameter detected by the detecting means becomes equal to a predetermined value, and wherein the servo control circuit is operated while the driving means is driving the second moving means so as control the first moving means to reduce a moving quantity of the second moving means after the physical parameter detected by the detecting means becomes equal to the predetermined value to counteract for a slow response speed of the driving circuit.

10. A surface metrological apparatus according to claim 9, wherein the second moving means comprises an inchworm system.

11. A surface metrological apparatus according to claim 10, wherein a contraction/stretch distance of the inchworm system is set to be greater than a step distance of the inchworm system.

12. A surface metrological apparatus according to claim 9, wherein the driving circuit includes means for driving the second moving means at a predetermined speed.

13. A surface metrological apparatus according to claim 9, wherein the driving circuit comprises means for detecting a difference between the physical parameter detected by the detecting means and a predetermined value.

14. A surface metrological apparatus according to claim 9, wherein the second moving means comprises a clamp system having a clamp condition which is maintained unchanged after the physical parameter detected by the detecting means becomes equal to the predetermined value.

15. A surface metrological apparatus according to claim 9, wherein the driving circuit comprises means for controlling the second moving means according to a predetermined control sequence.

16. A surface metrological apparatus according to claim 15, wherein the driving circuit further comprises means for manually controlling the second moving means after the predetermined control sequence ends.

17. A surface metrological apparatus according to claim 16, wherein the predetermined control sequence ends when the physical parameter detected by the detecting means becomes equal to the predetermined value, and wherein the predetermined control sequence is repeated a plurality of times to confirm that the physical parameter detected by the detecting means has become equal to the predetermined parameter.

18. A surface metrological apparatus according to claim 9, further comprising means for setting a desired moving quantity of the means for changing a positional relationship between the probe-tip and the sample.

19. A surface metrological apparatus according to claim 9, wherein the second moving means comprises a plurality of driving means, and further comprising switching means for separately controlling the plurality of driving means with the driving circuit.

* * * * *